(12) United States Patent
Yoshida et al.

(10) Patent No.: US 9,551,813 B2
(45) Date of Patent: Jan. 24, 2017

(54) OPTICAL FILM, POLARIZING PLATE USING SAME, AND LIQUID CRYSTAL DISPLAY DEVICE

(71) Applicant: FUJIFILM Corporation, Tokyo (JP)

(72) Inventors: Aiko Yoshida, Kanagawa (JP); Yutaka Nozoe, Kanagawa (JP); Yoshinori Kanazawa, Kanagawa (JP); Yasukazu Kuwayama, Kanagawa (JP); Yu Naito, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/839,154

(22) Filed: Aug. 28, 2015

(65) Prior Publication Data

US 2015/0369960 A1 Dec. 24, 2015

Related U.S. Application Data

(63) Continuation of application No. PCT/JP2014/057563, filed on Mar. 19, 2014.

(30) Foreign Application Priority Data

Mar. 22, 2013 (JP) ................................. 2013-061113

(51) Int. Cl.
   *G02B 5/30* (2006.01)
   *G02F 1/1335* (2006.01)
   (Continued)

(52) U.S. Cl.
   CPC . *G02B 1/04* (2013.01); *G02B 1/14* (2015.01); *G02B 5/3025* (2013.01);
   (Continued)

(58) Field of Classification Search
   CPC ................ C08L 1/08; Y10T 428/31971; Y10T 428/105; G02B 1/04; G02B 5/3025; G02B 5/3033; G02F 1/133528; G02F 2201/50
   See application file for complete search history.

(56) References Cited

U.S. PATENT DOCUMENTS

2011/0134374 A1* 6/2011 Fukagawa .................. C08J 5/18
                                                  349/96
2016/0124123 A1* 5/2016 Noro .......................... C08J 5/18
                                                  349/96

FOREIGN PATENT DOCUMENTS

| JP | 2002-322294 A | 11/2002 |
| JP | 2011-118135 A | 6/2011 |
| JP | 2011-126968 A | 6/2011 |

OTHER PUBLICATIONS

International Search Report issued in PCT/JP2014/057563 on May 27, 2014.
(Continued)

*Primary Examiner* — Sophie Hon
(74) *Attorney, Agent, or Firm* — Jean C. Edwards, Esq.; Edwards Neils LLC

(57) ABSTRACT

An optical film including cellulose acylate and a compound represented by General Formula (I) described below, a polarizing plate, and a liquid crystal display device;

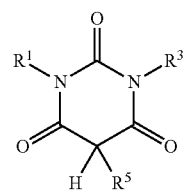

General Formula (I)

$R^1$ and $R^3$ represent hydrogen atoms, alkyl groups having 1 to 20 carbon atoms, cycloalkyl groups having 3 to 20
(Continued)

carbon atoms, alkenyl groups having 2 to 20 carbon atoms, or aromatic groups having 6 to 20 carbon atoms. $R^5$ represents a hydrogen atom, an unsubstituted alkyl group having 1 to 20 carbon atoms, a cycloalkyl group having 3 to 20 carbon atoms, an alkenyl group having 2 to 20 carbon atoms, or an aralkyl group represented by -$L^5$-$Ar^5$ ($L^5$ represents an alkylene group having 1 to 20 carbon atoms and $Ar^5$ represents an aromatic group having 6 to 20 carbon atoms). Here, the total of ring structures present in $R^1$, $R^3$, and $R^5$ is one or two.

11 Claims, 2 Drawing Sheets

(51) Int. Cl.
  *G02B 1/04* (2006.01)
  *G02B 1/14* (2015.01)

(52) U.S. Cl.
  CPC ..... *G02B 5/3033* (2013.01); *G02F 1/133528* (2013.01); *G02F 2201/50* (2013.01); *Y10T 428/105* (2015.01); *Y10T 428/31971* (2015.04)

(56) References Cited

OTHER PUBLICATIONS

Written Opinion issued in PCT/JP2014/057563 on May 27, 2014.
Notice of Reasons for Rejection issued by the Japanese Patent Office on May 24, 2016 in connection with corresponding Japanese Patent Application No. 2015-506830.
Notification of Reason for Refusal issued by the Korean Patent Office on Oct. 14, 2016 in connection with Korean Patent Application No. 10-2015-7025510.
Office Action issued by the State Intellectual Property Office of the People's Republic of China on Oct. 8, 2016 in connection with Chinese Patent Application No. 201480017353.0.

\* cited by examiner

OPTICAL FILM, POLARIZING PLATE USING SAME, AND LIQUID CRYSTAL DISPLAY DEVICE

CROSS-REFERENCE TO RELATED APPLICATIONS

This application is a Continuation of PCT International Application No. PCT/JP2014/057563 filed on Mar. 19, 2014, which was published under PCT Article 21(2) in Japanese, which claims priority under 35 U.S.C §119(a) to Japanese Patent Application No. 2013-061113 filed on Mar. 22, 2013. The above application is hereby expressly incorporated by reference, in its entirety, into the present application.

BACKGROUND OF THE INVENTION

1. Field of the Invention

The present invention relates to an optical film, a polarizing plate using the same, and a liquid crystal display device.

2. Description of the Related Art

Optical films such as a cellulose acylate film are used in a variety of liquid crystal display devices as optical members for the liquid crystal display devices, for example, a support for an optical compensation film, a protective film for a polarizing plate, or the like.

Occasions are increasing for liquid crystal display devices to be used outdoors as mainly portable devices, other than to be used indoors as TVs and the like. Therefore, there is a demand for the development of liquid crystal display devices capable of withstanding applications under a higher temperature and a higher humidity than in the related art.

Furthermore, there is an intensifying demand for liquid crystal display devices to withstand harsh operation conditions in diversifying applications and a higher level of durability than in the related art has been demanded every year.

Regarding optical films for which a cellulose acylate film is used, it is known that, in order to further improve the performance or solve a variety of problems in relation to the characteristics or manufacturing of the optical films, a specific compound is added to the film.

For example, a gelatinizing agent having a specific structure with an intention of gelatinizing a cellulose acylate solution in a solvent cast method (refer to JP2002-322294A), an organic acid exhibiting a specific acid dissociation constant with an intention of improving the durability of a polarizer that deteriorates at a high temperature depending on a variety of humidity conditions (high humidity or low humidity) (refer to JP2011-118135A), barbituric acid having a specific substituent at the fifth position with an intention of suppressing the change in optical characteristics that change depending on humidity (refer to JP2011-126968A), and the like have been proposed.

SUMMARY OF THE INVENTION

The present invention, as described above, imparts sufficient durability to optical films even in harsh operation environments such as a high or low humidity at a high temperature. Particularly, the request level of the performance is increasing every year due to the thickness reduction of optical films which is in accordance with the recent thickness reduction of displays.

In addition, as a result of intensive studies, the present inventors found that, in a case in which a compound that is added to a film with an intention of improving the functions of an optical film in the related art is used for the optical film having a reduced thickness, other performances are affected. Examples of the affected performances include the hardness decreased by a plasticizer. In addition, the present inventors clarified that, in an optical film having a reduced thickness, from the viewpoint of workability, it is necessary not only to form a multilayer configuration by providing a hard coat layer and the like but also to provide an appropriate hardness to the optical film. However, in a case in which the hardness is improved, the adhesiveness between the respective layers in the multilayer configuration of the optical film, particularly, the adhesiveness with the hard coat layer, degrades and thus there has been a very difficult problem of the satisfaction of both the multilayer configuration and the hardness.

Therefore, an object of the present invention is to provide an optical film in which durability having an increasing request level, particularly, durability under conditions of a high or low humidity at a high temperature, hardness, and adhesiveness are all improved and a polarizing plate and a liquid crystal display device in which optical characteristics are maintained and durability including display unevenness is improved by using the optical film.

As a result of studies regarding the structures and properties of a variety of compounds, for example, compounds known as additives in the related art such as plasticizers, curing agents, ultraviolet absorbers, antioxidants, retardation adjusters, and organic acids from the viewpoint of durability, hardness, and adhesiveness, the present inventors found possibilities of achieving the above-described object from compounds having a barbituric acid skeleton. While studies have been made regarding barbituric acid compounds that have already been proposed for other purposes, it has not been possible to find any compound capable of solving all the problems. Therefore, the studies were made again for evaluation of the relationship between a substituent of barbituric acid and each of the three characteristics described above. As a result of overlapping the evaluations, a specific area which satisfies all the three characteristics was found out. According to the findings, a new compound was synthesized and the effect thereof was confirmed to complete the present invention That is, the above-described object has been achieved by means described below.

<1> An optical film including: cellulose acylate; and at least one kind of compound represented by General Formula (I) described below.

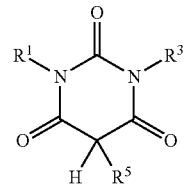

General Formula (I)

In General Formula (I), each of $R^1$ and $R^3$ independently represents a hydrogen atom, an alkyl group having 1 to 20 carbon atoms, a cycloalkyl group having 3 to 20 carbon atoms, an alkenyl group having 2 to 20 carbon atoms, or an aromatic group having 6 to 20 carbon atoms. $R^5$ represents a hydrogen atom, an unsubstituted alkyl group having 1 to 20 carbon atoms, a cycloalkyl group having 3 to 20 carbon atoms, an alkenyl group having 2 to 20 carbon atoms, or an aralkyl group represented by Formula (1) described below. Here, the total of ring structures present in $R^1$, $R^3$, and $R^5$ is one or two.

$$*\text{-}L^5\text{-}Ar^5 \qquad \text{Formula (1):}$$

In Formula (1), $L^5$ represents an alkylene group having 1 to 20 carbon atoms. $Ar^5$ represents an aromatic group having 6 to 20 carbon atoms. * is a position at which the aralkyl group is linked to the ring structure in General Formula (I).

<2> The optical film according to <1>, in which, in General Formula (I), $R^5$ is an unsubstituted alkyl group having 1 to 20 carbon atoms, a cycloalkyl group having 3 to 20 carbon atoms, or an aralkyl group represented by Formula (1).

<3> The optical film according to <1> or <2>, in which $R^5$ in General Formula (I) is an aralkyl group represented by Formula (1).

<4> The optical film according to any one of <1> to <3>, in which $L^5$ in Formula (1) is a group represented by Formula (1-2) described below.

$$-[C(R^{51})(R^{52})]n- \qquad \text{Formula (1-2):}$$

In Formula (1-2), each of $R^{51}$ and $R^{52}$ independently represents a hydrogen atom, an alkyl group having 1 to 19 carbon atoms, a cycloalkyl group having 3 to 19 carbon atoms, an alkenyl group having 2 to 19 carbon atoms, or an aromatic group having 6 to 19 carbon atoms. n represents an integer from 1 to 20.

<5> The optical film according to any one of <1> to <4>, in which $L^5$ in Formula (1) is a substituted or unsubstituted methylene group or a substituted or unsubstituted ethylene group.

<6> The optical film according to any one of <1> to <5>, in which $Ar^5$ in Formula (1) is an unsubstituted aromatic group having 6 to 20 carbon atoms or an aromatic group having 6 to 20 carbon atoms substituted with a substituent having a negative Hammett substituent constant σp.

<7> The optical film according to any one of <1> to <6>, in which each of $R^3$ and $R^5$ in General Formula (I) has one aromatic ring structure.

<8> The optical film according to any one of <1> to <7>, in which, the Hammett substituent constants σp and σm of $R^5$ in General Formula (I) are both negative.

<9> The optical film according to any one of <1> to <8>, in which a total degree of acyl substitution A of cellulose acylate satisfies a formula described below.

$$1.5 \leq A \leq 3.0$$

<10> The optical film according to any one of <1> to <9>, in which an acyl group in the cellulose acylate is an acetyl group and a total degree of acetyl substitution B of the cellulose acylate satisfies a formula described below.

$$2.0 \leq B \leq 3.0$$

<11> The optical film according to any one of <1> to <10>, in which the optical film is made up of at least two layers, which is a hard coat layer and a layer including cellulose acylate and at least one kind of compound represented by General Formula (I).

<12> A polarizing plate including: a polarizer; and the optical film according to any one of <1> to <11> on at least one surface of the polarizer.

<13> A liquid crystal display device including at least: the polarizing plate according to <12>; and a liquid crystal cell.

<14> A liquid crystal display device, in which polarizing plates are provided on both sides of a liquid crystal cell, and at least one of the polarizing plates is the polarizing plate according to <12>.

<15> The liquid crystal display device according to <13> or <14>, further including: a hard coat layer on a viewer-side surface of the polarizing plate disposed on a viewer side.

In the present specification, numerical ranges expressed using "to" include numerical values before and after the "to" as the upper limit value and the lower limit value.

In the present specification, unless particularly otherwise described, group that are allowed to have a substituent (for example, groups having an alkyl site, an aryl site, or a hetero ring site) may have a substituent. For example, an alkyl group is an alkyl group which may have a substituent and an aryl group or an aromatic group is an aryl group or an aromatic group which may have a substituent.

In addition, in a case in which at least two substituents are present in the same atom or a case in which adjacent bonded atoms respectively have a substituent, these substituents may be bonded together so as to form a ring.

Furthermore, in a case in which multiple groups with the same reference numeral are present or a case in which multiple times of repetition are performed and, consequently, multiple groups with the same reference numeral are present, these groups may be identical to or different from each other.

In the present specification, when multiple substituents or linking groups (hereinafter, referred to as substituents or the like) are simultaneously or selectively regulated, the respective substituents or the like may be identical to or different from each other.

In the optical film of the present invention, durability having an increasing request level, particularly, durability under conditions of a high or low humidity at a high temperature, hardness, and adhesiveness are all improved and performances better than those of the optical film of the related art are exhibited. In addition, in the polarizing plate and the liquid crystal display device in which the optical film of the present invention is used as a protective film for a polarizer in a polarizing plate, optical characteristics and durability including display unevenness are improved.

The above-described and other characteristics and advantages of the present invention will be further clarified from the following description with reference to the appropriately-accompanying drawings.

DESCRIPTION OF THE PREFERRED EMBODIMENTS

Figure 1:
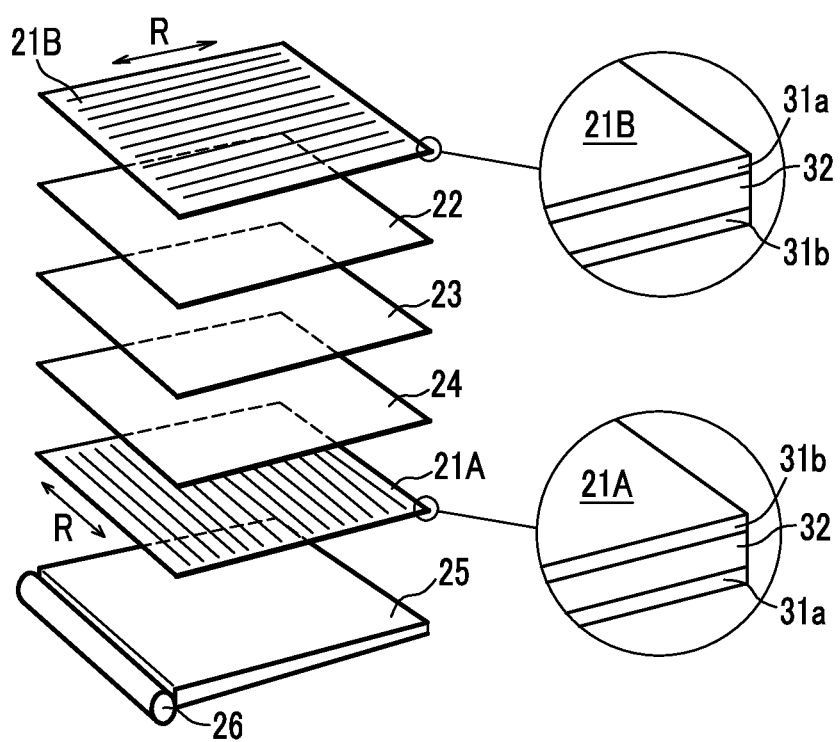
FIG. 1 is an example schematically illustrating the internal structure of a liquid crystal display device of the present invention.

Hereinafter, the present invention will be described in detail using embodiments.

[Optical Film]

An optical film of the present invention is made of at least one layer of a cellulose acylate film containing cellulose acylate and at least one kind of compound represented by General Formula (I). In addition, the cellulose acylate film may be made up of multiple layers and the compound represented by General Formula (I) may be included in any or all layers. In a case in which cellulose acylate films having a protective function are laminated on both surfaces of the thickest layer out of the multiple layers of the optical film, that is, the base layer, it is effective to make the base layer, which is a layer in the center, contain the compound represented by General Formula (I).

Here, the cellulose acylate film or layer means that, in a resin component configuring the film or layer, the content of cellulose acylate is 50% by mass or more. The content of the cellulose acylate in the resin component is preferably 60% by mass or more, more preferably 80% by mass or more, still more preferably 90% by mass or more, and particularly preferably 95% by mass or more. The upper limit of the content of cellulose acylate is not particularly limited, but is realistically 100% by mass.

Meanwhile, the optical film of the present invention may also form a multilayer configuration with a layer not containing cellulose acylate or, if containing, containing less than 50% by mass of cellulose acylate in relation to all the resin component as the resin component in addition to the above-described cellulose acylate film. As the above-described layer, a functional layer specialized with a specific function can be used and examples thereof include a hard coat layer and the like.

Examples of the functional layer other than the hard coat layer include an antiglare layer, a clear hard coat layer, an antireflection layer, an antistatic layer, an antifouling layer, a light-scattering layer, and the like. As the functional layer, a single layer may have multiple functions and, in the present invention, the functional layer is preferably provided on the hard coat layer.

The optical film of the present invention is useful for a variety of applications such as a polarizing plate protective film and a surface protective film disposed on an image display surface. Particularly, since the optical film of the present invention has high hardness, has excellent adhesiveness between layers in a case in which the optical film is made up of the cellulose acylate film and non-cellulose acylate layers (preferably a hard coat layer), which does not significantly degrade even after the optical film is stored for a long period of time, and has excellent durability, the optical film is suitable for the application as a polarizing plate protective film.

<<Cellulose Acylate Film>>

In the present invention, the cellulose acylate film is made of a film in which the proportion of cellulose acylate in the resin constituent component is 50% by mass or more as described above and is a narrowly-defined optical film of the present invention.

As described above, the cellulose acylate film may be a single layer or a laminate of two or more layers. In a case in which the cellulose acylate film is a laminate of two or more layers, the cellulose acylate film preferably has a bi-layer structure or a tri-layer structure and more preferably has a tri-layer structure. In the case of a tri-layer structure, the cellulose acylate film preferably includes a single core layer (that is, the thickest layer, hereinafter, also referred to as the base layer) and a skin layer A and a skin layer B that sandwich the core layer. That is, the cellulose acylate film of the present invention preferably has a tri-layer structure of the skin layer B/the core layer/the skin layer A. The skin layer A refers to a layer that comes into contact with a metal support described below when the cellulose acylate film is manufactured through solvent casting and the skin layer B refers to an air interface layer on a side opposite to the metal support. Meanwhile, the skin layer A and the skin layer B are also collectively referred to as skin layers (or surface layers).

In the present invention, the cellulose acylate film contains cellulose acylate and at least one kind of compound represented by General Formula (I) described below.

<1 Compound Represented by General Formula (I)>

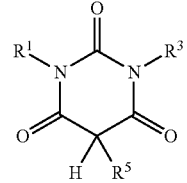

General Formula (I)

In General Formula (I), each of $R^1$ and $R^3$ independently represents a hydrogen atom, an alkyl group having 1 to 20 carbon atoms, a cycloalkyl group having 3 to 20 carbon atoms, an alkenyl group having 2 to 20 carbon atoms, or an aromatic group having 6 to 20 carbon atoms.

$R^5$ represents a hydrogen atom, an unsubstituted alkyl group having 1 to 20 carbon atoms, a cycloalkyl group having 3 to 20 carbon atoms, an alkenyl group having 2 to 20 carbon atoms, or an aralkyl group represented by Formula (1) described below. Here, the total of ring structures present in $R^1$, $R^3$, and $R^5$ is one or two.

$$*-L^5-Ar^5 \quad \text{Formula (1):}$$

In Formula (1), $L^5$ represents an alkylene group having 1 to 20 carbon atoms. $Ar^5$ represents an aromatic group having 6 to 20 carbon atoms. * is a position at which the aralkyl group is linked to the ring structure in General Formula (I).

The compound represented by General Formula (I) contributes to the improvement or maintenance of hardness by being present near the main chain of cellulose acylate so as to decrease the free volume and by removing a free space using a hydrogen bond with cellulose acylate and, furthermore, filling the free space with the ring structure portion of a barbituric acid compound, which comes closer through the interaction using the hydrogen bond, trapped in a space made by β-glucose in an adjacent polymer molecule.

In addition, when the compound represented by General Formula (I) is included in the cellulose acylate film, the durability of a polarizer provided with the optical film of the present invention is improved and, furthermore, the compound contributes to the provision of a liquid crystal display device in which display unevenness does not easily occur.

Furthermore, the compound represented by General Formula (I) significantly contributes to the exhibition of the high adhesiveness between the cellulose acylate film, which is easily deteriorated due to the irradiation with light or the like, and the hard coat layer for a long period of time.

The number of carbon atoms in the alkyl group of $R^1$ and $R^3$ in General Formula (I) is preferably in a range of 1 to 10, more preferably in a range of 1 to 5, and still more preferably in a range of 1 to 3. The alkyl group of $R^1$ and $R^3$ is particularly preferably a methyl group or an ethyl group.

The number of carbon atoms in the cycloalkyl group of $R^1$ and $R^3$ is preferably in a range of 3 to 10 and more preferably 5 or 6. Examples of the cycloalkyl group include a cyclopropyl group, a cyclopentyl group, and a cyclohexyl group and a cyclohexyl group is particularly preferred.

The number of carbon atoms in the alkenyl group of $R^1$ and $R^3$ is preferably in a range of 2 to 10 and more preferably in a range of 2 to 5.

The number of carbon atoms in the aromatic group of $R^1$ and $R^3$ is preferably in a range of 6 to 12 and more preferably in a range of 6 to 10.

The aromatic group of $R^1$ and $R^3$ may be an aromatic hydrocarbon group or an aromatic heterocyclic group, but is preferably an aromatic hydrocarbon group. The aromatic hydrocarbon group is preferably a phenyl group or a naphthyl group and more preferably a phenyl group.

Each of $R^1$ and $R^3$ is, independently, more preferably a hydrogen atom, an alkyl group having 1 to 20 carbon atoms, a cycloalkyl group having 3 to 20 carbon atoms, or an aromatic group having 6 to 20 carbon atoms, any of $R^1$ and $R^3$ is still more preferably an alkyl group having 1 to 20 carbon atoms, a cycloalkyl group having 3 to 20 carbon atoms, or an aromatic hydrocarbon group having 6 to 20 carbon atoms, and any of $R^1$ and $R^3$ is most preferably an aromatic hydrocarbon group having 6 to 20 carbon atoms.

Here, the respective groups of $R^1$ and $R^3$ may have a substituent S described below.

Here, regarding "20" which is the upper limit of the preferred number of carbon atoms in the substituent S, a value that satisfies the total number of carbon atoms specified by $R^1$ and $R^3$ becomes the upper limit.

For example, in the case of the alkyl group having 1 to 20 carbon atoms, "20" which is the upper limit of the preferred number of carbon atoms in the substituent S substituting the alkyl group actually indicates "19"; in the case of the cycloalkyl group having 3 to 20 carbon atoms, "20" which is the described upper limit actually indicates "17"; in the case of the alkenyl group having 2 to 20 carbon atoms, "20" which is the described upper limit actually indicates "18"; and in the case of the aromatic group having 6 to 20 carbon atoms, "20" which is the described upper limit actually indicates "14".

Meanwhile, even in the case of groups other than $R^1$ and $R^3$, when the total number of carbon atoms is specified, what has been described above applies.

[Substituent S]

Examples of the substituent S include an alkyl group (preferably, for example, methyl, ethyl, isopropyl, t-butyl, pentyl, heptyl, 1-ethylpentyl, 2-ethylhexyl, benzyl, 2-ethoxyethyl, 1-carboxymethyl, or the like having 1 to 20 carbon atoms), an alkenyl group (preferably, for example, vinyl, allyl, oleyl, or the like having 2 to 20 carbon atoms), an alkynyl group (preferably, for example, ethynyl, 2-butynyl, phenylethynyl, or the like having 2 to 20 carbon atoms), a cycloalkyl group (preferably, for example, cyclopropyl, cyclopentyl, cyclohexyl, 4-methylcyclohexyl, or the like having 3 to 20 carbon atoms), an aryl group (preferably, for example, phenyl, 1-naphtyl, 4-methoxyphenyl, 2-chlorophenyl, 3-methylphenyl, or the like having 6 to 20 carbon atoms), a heterocyclic group (preferably a heterocyclic group having 0 to 20 carbon atoms in which the ring-configuring hetero atom is preferably an oxygen atom, a nitrogen atom, or a sulfur atom; the heterocyclic group having a 5- or 6-membered ring may be condensed with a benzene ring or a hetero ring, the ring may be a saturated ring, an unsaturated ring, or an aromatic ring, and examples thereof include 2-pyridyl, 4-pyridyl, 2-imidazolyl, 2-benzoimidazolyl, 2-thiazolyl, 2-oxazolyl, and the like), an alkoxy group (preferably, for example, methoxy, ethoxy, isopropyloxy, benzyloxy, or the like having 1 to 20 carbon atoms), an aryloxy group (preferably, for example, phenoxy, 1-naphthyloxy, 3-methylphenoxy, 4-methoxyphenoxy, or the like having 6 to 20 carbon atoms), an alkylthio group (preferably, for example, methylthio, ethylthio, isopropylthio, benzylthio, or the like having 1 to 20 carbon atoms), an arylthio group (preferably, for example, phenylthio, 1-naphthylthio, 3-methylphenylthio, 4-methoxyphenylthio, or the like having 6 to 20 carbon atoms), an acyl group (an alkyl carbonyl group, an alkenyl carbonyl group, an aryl carbonyl group, and a heterocyclic carboyl group are included, the number of carbon atoms is preferably 20 or less, and examples thereof include acetyl, pivaloyl, acryloyl, methacryloyl, benzoyl, nicotinoyl, and the like), an alkoxy carbonyl group (preferably, for example, ethoxycarbonyl, 2-ethylhexyloxycarbonyl, or the like having 2 to 20 carbon atoms), an aryloxy carbonyl group (preferably, for example, phenyloxy carbonyl, naphtyloxy carbonyl, or the like having 7 to 20 carbon atoms), an amino group (an amino group, an alkyl amino group, an aryl amino group, and a heterocyclic amino group are included, the number of carbon atoms is preferably in a range of 0 to 20, and examples thereof include amino, N,N-dimethylamino, N,N-diethylamino, N-ethylamino, anilino, 1-pyrrolidinyl, piperidino, morphonyl, and the like), a sulfoneamide group of alkyl or aryl (preferably, for example, N,N-dimethylsulfoneamide, N-phenylsulfoneamide, or the like having 0 to 20 carbon atoms), a sulfamoyl group of alkyl or aryl (preferably, for example, N,N-dimethylsulfamoyl, N-phenylsulfamoyl, or the like having 0 to 20 carbon atoms), an acyloxy group (preferably, for example, acetyloxy, benzoyloxy, or the like having 1 to 20 carbon atoms), a carbamoyl group of alkyl or aryl (preferably, for example, N,N-dimethylcarbamoyl, N-phenylcarbamoyl, or the like having 1 to 20 carbon atoms), an acylamino group (preferably, for example, acetylamino, acryloylamino, benzoylamino, nicotinamide, or the like having 1 to 20 carbon atoms), a cyano group, a hydroxyl group, a mercapto group, and a halogen atom (for example a fluorine atom, a chlorine atom, a bromine atom, an iodine atom, or the like).

The substituent S that $R^1$ and $R^3$ may further have an identical or different substituent S.

The substituent S that the respective groups of $R^1$ and $R^3$ may have is preferably an alkyl group, an aryl group, an alkoxy group, an acyl group, or a halogen atom and more preferably an alkyl group, an aryl group, an alkoxy group, or an acyl group.

The cycloalkyl group having 3 to 20 carbon atoms and the alkenyl group having 2 to 20 carbon atoms of $R^5$ are respectively identical to the cycloalkyl group and the alkenyl group of $R^1$ and $R^3$ and the preferred range thereof is also identical.

The unsubstituted alkyl group having 1 to 20 carbon atoms of $R^5$ is identical to the alkyl group of $R^1$ and $R^3$ except for the fact that the unsubstituted alkyl group does not have any substituent, but the number of carbon atoms is preferably in a range of 1 to 10, more preferably in a range of 1 to 5, and still more preferably in a range of 1 to 4.

Hereinafter, the aralkyl group represented by Formula (1) of $R^5$ will be described.

The total number of carbon atoms in the aralkyl group represented by Formula (1) is preferably 21 or less and more preferably in a range of 7 to 20.

The number of carbon atoms in the alkylene group of $L^5$ in Formula (1) is preferably in a range of 1 to 10, more preferably in a range of 1 to 6, still more preferably 1 or 2, and particularly preferably 1.

Here, $L^5$ may have a substituent. Examples of the substituent include the substituent S. The substituent that the alkylene group of $L^5$ may substitute is preferably an alkyl group, a cycloalkyl group, an alkenyl group, or an aromatic group. Meanwhile, the substituent that the alkylene group of $L^5$ may substitute may further have a substituent, for example, the substituent S. Examples of the substituent include an alkyl group substituted with one or more alkyl carbonyl groups (for example, refer to compounds (18) and (19) exemplified below) and an alkyl group substituted with a benzoyl group and specific examples thereof include a phenacyl group (a benzoylmethyl group) (refer to the same compound (23)).

$L^5$ is preferably a group represented by Formula (1-2) described below.

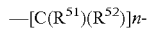  Formula (1-2):

In Formula (1-2), each of $R^{51}$ and $R^{52}$ independently represents a hydrogen atom, an alkyl group having 1 to 19 carbon atoms, a cycloalkyl group having 3 to 19 carbon atoms, an alkenyl group having 2 to 19 carbon atoms, or an aromatic group having 6 to 19 carbon atoms. n represents an integer from 1 to 20.

The alkyl group, the cycloalkyl group, the alkenyl group, and the aromatic group of $R^{51}$ and $R^{52}$ are identical to those of $R^1$ and $R^3$ respectively and the preferred groups are also identical. Each of $R^{51}$ and $R^{52}$ is, independently, preferably a hydrogen atom, an alkyl group having 1 to 19 carbon atoms, or an aromatic group having 6 to 19 carbon atoms and, from the viewpoint of stability and durability during the formation of a film, either or both $R^{51}$ and $R^{52}$ are preferably hydrogen atoms. Specifically, it is preferable that $R^{51}$ is a hydrogen atom and $R^{52}$ is a hydrogen atom, an alkyl group having 1 to 19 carbon atoms, or an aromatic group having 6 to 19 carbon atoms, it is more preferable that $R^{51}$ is a hydrogen atom and $R^{52}$ is a hydrogen atom or an aromatic group having 6 to 19 carbon atoms, and it is particularly preferable that $R^{51}$ and $R^{52}$ are both hydrogen atoms.

In a case in which n is an integer from 2 to 20 in Formula (1-2), $nR^{51}$s and $nR^{52}$s in $L^5$ represented by Formula (1-2) may be identical to or different from each other, but either or both $R^{51}$ and $R^{52}$ are preferably hydrogen atoms.

$L^5$ may be a branched alkylene group or a straight alkylene group in which either or both $R^{51}$ and $R^{52}$ are alkyl groups having 1 to 19 carbon atoms, but is preferably a straight alkylene group. Examples of the preferred straight alkylene group include alkylene groups in which $R^{51}$ and $R^{52}$ in Formula (1-2) are all hydrogen atoms. In a case in which $L^5$ is a straight alkylene group, $Ar^5$ is bonded to the terminal of the alkylene group of $L^5$.

n is preferably an integer from 1 to 10, more preferably an integer from 1 to 5, still more preferably an integer from 1 to 3, and particularly preferably 1 or 2. The alkylene group of $L^5$ represented by Formula (1-2) having the particularly-preferred n is preferably an alkylene group linked through one or two carbon atoms, that is, a methylene group or an ethylene group and $Ar^5$ is linked to the ring structure of General Formula (I) through the above-described alkylene group.

The aromatic group having 6 to 20 carbon atoms of $Ar^5$ in Formula (1) is identical to the aromatic group of $R^1$ and $R^3$ and the preferred range is also identical.

The aromatic group of $Ar^5$ may have a substituent and examples of the substituent include the substituent S.

Among the substituents that the aromatic group of $Ar^5$ may have, a substituent having a negative Hammett substituent constant σp is preferred since all the $R^5$s can satisfy the Hammett conditions described below.

Examples of the preferred substituents out of the substituents that the aromatic group may have include an alkyl group having 1 to 4 carbon atoms, a cycloalkyl group having 3 to 6 carbon atoms, an alkoxy group having 1 to 6 carbon atoms, an amino group, and the like which may have a substituent. More specific examples thereof include a methyl group (σp: −0.17, σm: −0.07), an ethyl group (σp: −0.15, σm: −0.07), an n-propyl group (σp: −0.13, σm: −0.06), an n-butyl group (σp: −0.16, σm: −0.08), a cyclohexyl group (σp: −0.15, σm: −0.05), a benzyl group (σp: −0.09, σm: −0.08), a phenethyl group (σp: −0.12, σm: −0.07), a phenyl group (σp: −0.01, σm: 0.06), a methoxy group (σp: −0.27, σm: 0.12), an ethoxy group (σp: −0.24, σm: 0.10), a phenoxy group (σp: −0.03, σm: 0.25), a dimethylamino group (σp: −0.83, σm: −0.16), a methylamino group (σp: −0.70, σm: −0.21), a methoxycarbonylamino group (σp: −0.17, σm: −0.02), a hydroxy group (σp: −0.37, σm: 0.12), a styryl group (σp: −0.07, σm: 0.03), and the like. Among these, the substituent that the aromatic group may have preferably does not have any ring structure.

Meanwhile, the Hammett substituent constants σp and σm are values described in Chemical Review, Vol. 91, pp. 165 to 195 (1991).

The Hammett equation is an empirical equation proposed by L. P. Hammett on 1935 in order to quantitatively discuss the influence of a substituent on the reaction or equilibrium of a benzene derivative and has been widely admitted to be applicable in recent years. As the substituent constants obtained using the Hammett equation, there are a σp value and a σm value. These values can be found in many ordinary books and are described in detail in, for example, "Lange's Handbook of Chemistry" edited by J. A. Dean, Vol. 12 (1979) (Mc Graw-Hill) or "Regions of Chemistry" special edition, Issue 122, pp. 96 to 103, (1979) (Nankodo Co., Ltd.). Meanwhile, in the present invention, while the respective substituents are limited or described using the Hammett substituent constant σp, this does not mean that the substituents are limited only to substituents having a value already known by documents, which can be found in the above-described books and any substituents having a value which belongs to the above-described range in a case in which the value is measured on the basis of the Hammett equation are also considered as the substituents even when the value is a value unknown by documents.

Examples of the preferred aralkyl group represented by Formula (1) include a benzyl group or a phenethyl group in which at least one hydrogen atom in $L^5$ may be substituted with the substituent S and/or at least one hydrogen atom in $Ar^5$ may be substituted with the substituent having a negative substituent constant σp, but an unsubstituted benzyl group and a phenetyl group are more preferred and an unsubstituted benzyl group is particularly preferred.

Among theses, $R^5$ in General Formula (I) is preferably a group having negative Hammett substituent constants σp and σm. Examples of the group having negative Hammett substituent constants σp and σm include the substituents exemplified as the substituents that substitute the aromatic group of $Ar^5$.

Examples of $R^5$ described above include an unsubstituted alkyl group having 1 to 4 carbon atoms, an unsubstituted cycloalkyl group having 4 to 6 carbon atoms, an aralkyl group having 7 to 14 carbon atoms, and the like. Specific examples thereof include a methyl group, an ethyl group, an n-propyl group, an n-butyl group, a cyclohexyl group, a benzyl group, a phenetyl group, a t-butyl group (σp: −0.20, σm: −0.10), an isopropyl group (σp: −0.15, σm: −0.04), and the like and a methyl group, an ethyl group, an n-propyl group, an n-butyl group, a cyclohexyl group, a benzyl group, and a phenetyl group are preferred. Meanwhile, regarding the aralkyl group having 7 to 14 carbon atoms, $R^5$ may have a substituent as long as the substituent can maintain negative substituent constants σp and σm.

In the compound represented by General Formula (I), $R^1$, $R^3$, and $R^5$ have one or two ring structures in total and preferably have two ring structures in total. In addition, in the compound represented by General Formula (I), only $R^5$ may have one or two ring structures and, in addition to $R^5$ having one ring structure, any one of $R^1$ and $R^3$ may have one ring structure. In the compound represented by General Formula (I), from the viewpoint of dissolution stability during the formation of a film, each of $R^3$ and $R^5$ preferably has one aromatic ring structure.

In General Formula (I), examples of the ring structure in the description of "$R^1$, $R^3$, and $R^5$ have one or two ring structures in total" include not only a case in which the basic skeleton of the substituent of $R^1$, $R^3$, or $R^5$ has a ring structure but also an aspect in which the substituent in $R^1$, $R^3$, or $R^5$ has a ring structure.

The ring structure is preferably a cyclic saturated hydrocarbon structure or an aromatic ring structure (aromatic hydrocarbon structure or aromatic heterocyclic structure) and at least one ring structure is preferably an aromatic ring structure. In addition, the ring structure may be a ring-fused structure.

In a case in which the ring structure is a cyclic saturated hydrocarbon structure, the cyclic saturated hydrocarbon structure is preferably present as a cycloalkyl group having 3 to 20 carbon atoms. More specifically, the cyclic saturated hydrocarbon structure is more preferably present as a cyclopropyl group, a cyclopentyl group, or a cyclohexyl group and particularly preferably present as a cyclohexyl group.

In addition, in a case in which the ring structure is an aromatic ring structure, the ring structure is preferably an aromatic hydrocarbon structure. The aromatic hydrocarbon structure is preferably present as an aryl group having 6 to 20 carbon atoms. More specifically, the aromatic hydrocarbon structure is more preferably present as a phenyl group or a naphthyl group and particularly preferably present as a phenyl group.

Among the compounds represented by General Formula (I), preferred compounds will be listed below.

(1) Compounds in which $R^5$ is an aralkyl group or a cycloalkyl group represented by Formula (1), either or both $R^1$ and $R^3$ is a group having a cycloalkyl group or an aromatic group, and, preferably, the group having a cycloalkyl group or an aromatic group is a cycloalkyl group or an aromatic group (2) Compounds in which $R^5$ is an unsubstituted alkyl group, $R^1$ and $R^3$ are both groups having a cycloalkyl group or an aromatic group, and, preferably, the groups having a cycloalkyl group or an aromatic group are cycloalkyl groups or aromatic groups The molecular weight of the compound represented by General Formula (I) is preferably in a range of 250 to 1200, more preferably in a range of 270 to 800, still more preferably in a range of 270 to 600, and particularly preferably in a range of 280 to 480.

When the molecular weight is 250 or more, the sublimation from the optical film is suppressed and, when the molecular weight is 1200 or less, the compatibility with cellulose acylate is excellent and thus the transparency of the optical film becomes favorable.

The ClogP of the compound represented by General Formula (I) is preferably in a range of −4.0 to 10.0, more preferably in a range of −2.0 to 6.0, still more preferably in a range of −1.0 to 5.0, and most preferably in a range of 0.0 to 5.0.

Here, ClogP will be described.

log P refers to the common logarithm of a partition coefficient P or a property value that expresses how a chemical substance is partitioned in the equilibrium of a two-phase system of oil (generally, 1-octanol) and water in a form of a quantitative numerical value, and is expressed by the following equation.

$$\log P = \log(C_{oil}/C_{water})$$

In the equation, $C_{oil}$ represents the molarity in an oil phase and $C_{water}$ represents the molarity in a water phase. When the value of logP positively increases from 0, the oil solubility increases and, when the absolute value thereof negatively increases, the water solubility increases. logP has a negative correlation with the water solubility of a chemical substance and is widely used as a parameter that estimates hydrophilic and hydrophobic properties. When considered from its definition, it is a principle to measure logP in an actual partition test, but the test is quite troublesome and thus the estimation from the structural formula is effective means.

Therefore, ClogP is used as the estimated value of logP. In the present specification, for ClogP, a lo P value estimation program: ClogP (strictly, a system of Daylight Chemical Information System, Inc.: a ClogP program combined into PCModels), which is developed from the Medchem project by C. Hansch, A. Leo et al., Pomona College, USA, is used. This program is based on the fragment method of Hansch-Leo and log P is estimated by partitioning a chemical structure into fragments and summing the extents of contribution of logPs assigned to the fragments.

Theories regarding ClogP are described in detail in, for example, C. Hansch & A. Leo, Substituent Constants For Correlation Analysis in Chemistry and Biology (John Wiley & Sons), A. J. Leo. Calculating log Poct from structure. Chem. Rev., 93, 1281-1306 (1993), and the like.

Hereinafter, specific examples of the compound represented by General Formula (I) of the present invention will be described, but the present invention is not limited thereto.

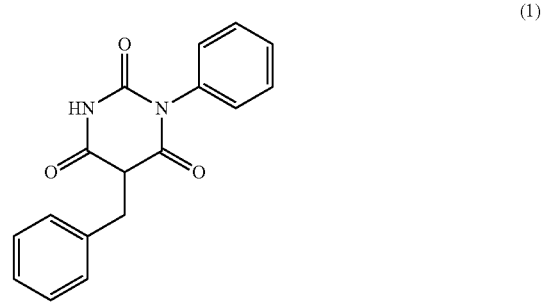

(1)

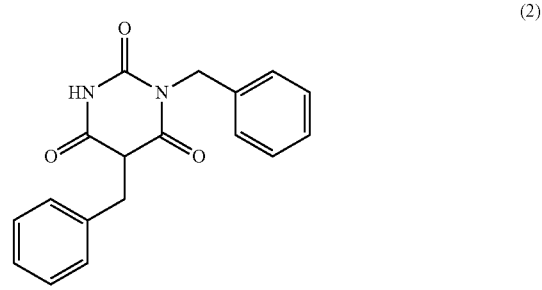

(2)

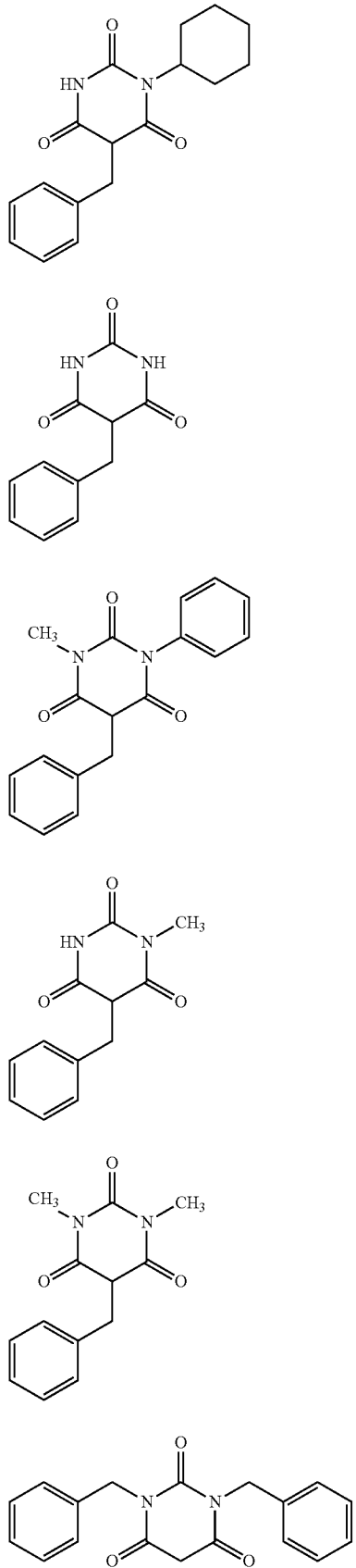
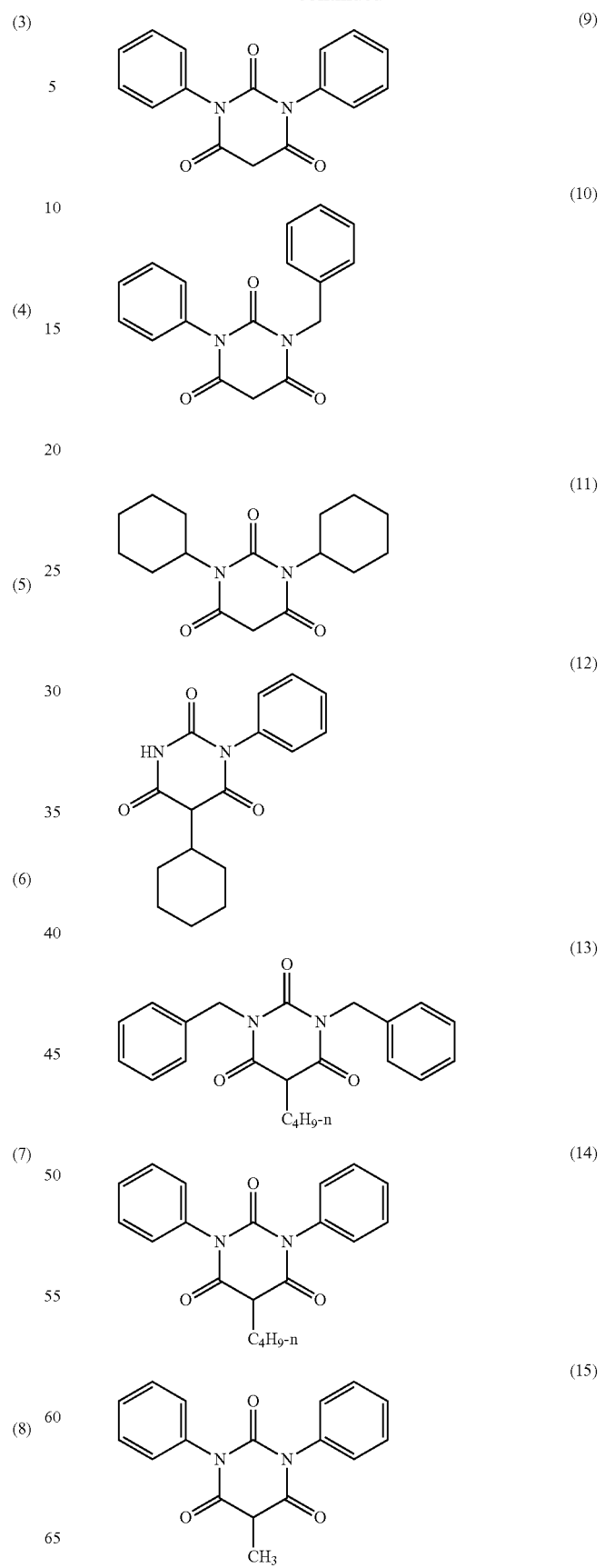

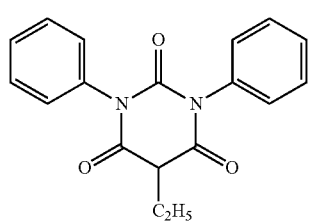
(15)
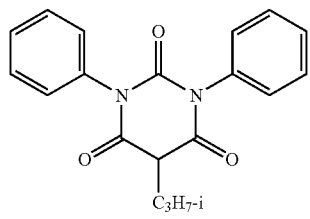
(17)
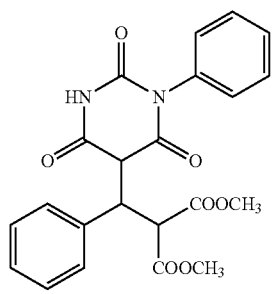
(18)
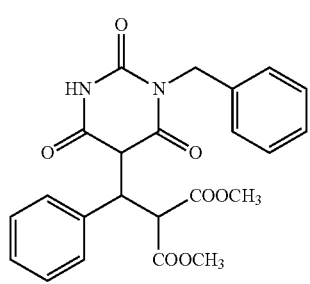
(19)
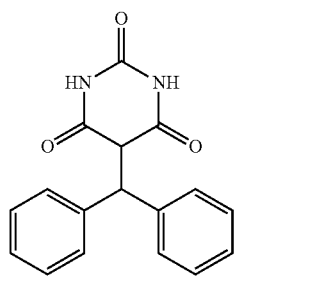
(20)
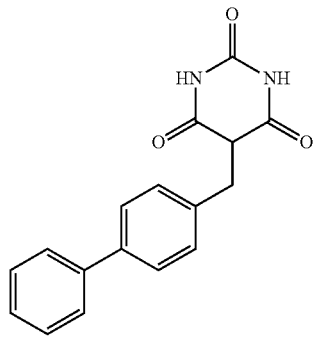
(21)
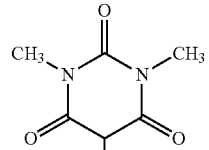
(22)
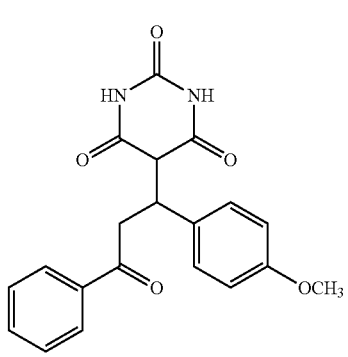
(23)
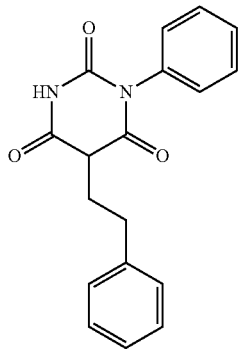
(24)
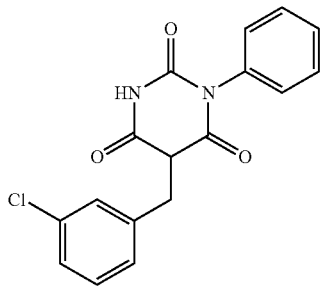
(25)
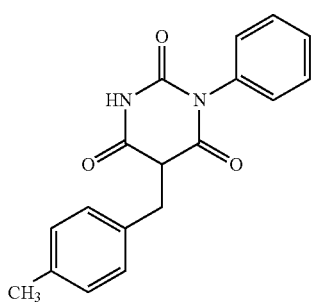
(26)

-continued

(27) 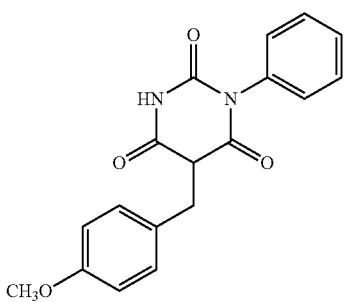

(28) 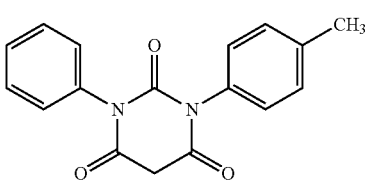

(29) 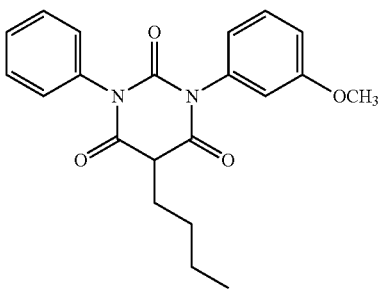

(30) 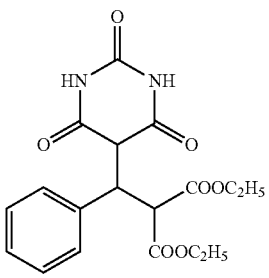

(31) 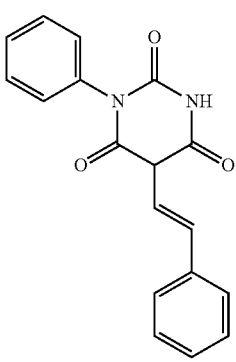

-continued

(32) 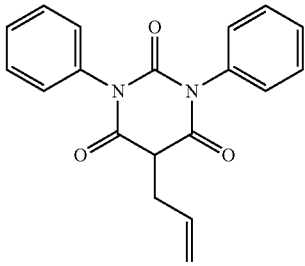

(33) 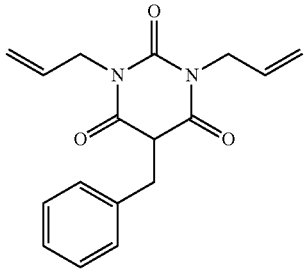

(34) 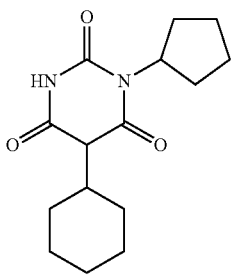

(35) 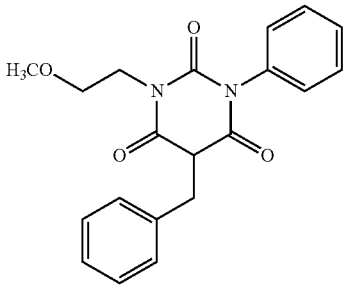

It is known that the compound represented by General Formula (I) can be synthesized using a synthesis method of barbituric acid in which a urea derivative and a malonic acid derivative are condensed. Barbituric acid having two substituents on N can be obtained by heating N,N'-disubstituted urea and malonyl chloride or mixing and heating malonic acid and an activating agent such as acetic anhydride and, for example, the methods described in Journal of the American Chemical Society, Vol. 61, p. 1015 (1939), Journal of Medicinal Chemistry, Vol. 54, p. 2409 (2011), Tetrahedron Letters, Vol. 40, p. 8029 (1999), the pamphlet of WO2007/150011A, and the like can be preferably used.

Here, malonic acid used in the condensation may be unsubstituted malonic acid or malonic acid having a substituent and, when malonic acid having a substituent corresponding to $R^5$ is used, it is possible to synthesize the compound represented by General Formula (I) of the present invention by building barbituric acid. In addition, when unsubstituted malonic acid and a urea derivative are condensed, barbituric acid having an unsubstituted fifth position can be obtained and thus the compound represented by General Formula (I) of the present invention may also be synthesized by modifying the above-described barbituric acid.

Meanwhile, the method for synthesizing the compound represented by General Formula (I) of the present invention is not limited to the above-described method.

The content of the compound represented by General Formula (I) in the cellulose acylate film is not particularly limited, but is preferably in a range of 0.1 parts by mass to 50 parts by mass, more preferably in a range of 0.2 parts by mass to 30 parts by mass, still more preferably in a range of 0.3 parts by mass to 15 parts by mass, and particularly preferably in a range of 0.3 parts by mass to 10 parts by mass in relation to 100 parts by mass of cellulose acylate. When the content is set as described above, the developing properties of hardness and durability, which are the effects of the present invention, become sufficient and, furthermore, the transparency of the film is also maintained.

<2 Cellulose Acylate>

In the present invention, one or more kinds of cellulose acylate, which serves as the main component of the cellulose acylate film, may be used. For example, the cellulose acylate may be cellulose acetate including only an acetyl group as an acyl substituent, cellulose acylate having a plurality of different acyl substituents, or a mixture of different kinds of cellulose acylate.

Examples of cellulose, which is a raw material of the cellulose acylate used in the present invention, include cotton linters, wood pulp (hardwood pulp and softwood pulp), and the like and cellulose obtained from any raw material cellulose can also be used. The cellulose may be used in a mixture form in some cases. As the raw material cellulose, for example, cellulose described in Marusawa and Uda's "Lectures of Plastic Materials (17) Cellulose-based resins", (Nikkan Kogyo Shimbun, Ltd.) (published on 1970) or Japan Institute of Invention and Innovation's Journal of Technical Disclosure No. 2001-1745 (pp. 7 and 8) can be used.

In the present invention, regarding an acyl groups in the cellulose acylate, only one acyl group or two or more acyl groups may be used. The cellulose acylate used in the present invention preferably has an acyl group having 2 or more carbon atoms as a substituent. The acyl group having 2 or more carbon atoms may be an aliphatic acyl group or an aromatic acyl group and there is no particular limitation. Examples thereof include alkyl carbonyl esters, alkenyl carbonyl esters, aromatic carbonyl esters, aromatic alkyl carbonyl esters, and the like of cellulose and these acyl groups may further have a substituent. Preferred examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexane carbonyl group, an oleoyl group, a benzoyl group, a naphthyl carbonyl group, a cinnamoyl group, and the like. Among these, an acetyl group, a propionyl group, a butanoyl group, a dodecanoyl group, an octadecanoyl group, a t-butanoyl group, an oleoyl group, a benzoyl group, a naphthyl carbonyl group, a cinnamoyl group, and the like are more preferred and an acetyl group, a propionyl group, and a butanoyl group (a case in which the acyl group has 2 to 4 carbon atoms) are still more preferred.

The cellulose acylate used in the present invention preferably has an acyl group having 2 to 4 carbon atoms as a substituent. When two or more acyl groups are used, one of them is preferably an acetyl group and other acyl groups having 2 to 4 carbon atoms being used are preferably propionyl groups or butyryl groups. A solution having favorable solubility can be produced using the above-described cellulose acylate and, particularly, in non-chlorine-based organic solvents (for example, alcohols such as methanol and ethanol), it becomes possible to produce favorable solutions. Furthermore, it becomes possible to produce a solution having a low viscosity and favorable filterability.

In the present invention, particularly, the acyl group in the cellulose acylate is preferably an acetyl group since the hardness improvement effect of the compound represented by General Formula (I) is excellent.

The cellulose acylate that is preferably used in the present invention will be described in detail.

A glucose unit bonded to β-1,4, which configures cellulose, has free hydroxyl groups at the second, third, and sixth positions. The cellulose acylate is a polymer obtained by acylating parts or all of these hydroxyl groups with acyl groups.

The degree of acyl substitution refers to the degree of the acylation of the hydroxyl groups in cellulose located at the second, third, and sixth positions. In a case in which the hydroxyl groups at the second, third, and sixth positions of all the glucose units are all acylated, the total degree of acyl substitution is three and, for example, in a case in which only the sixth positions of all the glucose units are all acylated, the total degree of acyl substitution is one. Similarly, in a case in which any one of the sixth and second positions of the respective glucose units are all acylated in all the hydroxyl groups in all glucose as well, the total degree of acyl substitution is also one.

That is, the degree of acyl substitution indicates the degree of acylation with a case in which all the hydroxyl groups in a glucose molecule are all acylated rated as three.

Regarding the details of the method for measuring the degree of acyl substitution, the degree of acyl substitution can be measured according to the method described in Tetsuka et. al., Carbohydrate. Res., 273, 83-91 (1995) or the method regulated by ASTM-D817-96.

The total degree of acyl substitution (A) of the cellulose acylate used in the present invention is preferably in a range of 1.5 to 3.0 (1.5≤A≤3.0), more preferably in a range of 2.00 to 2.97, still more preferably in a range of 2.50 to less than 2.97, and particularly preferably in a range of 2.70 to 2.95.

In addition, in the cellulose acetate in which only an acetyl group is used as the acyl group of the cellulose acylate, the total degree of acetyl substitution (B) is preferably in a range of 2.0 to 3.0 (2.0≤B≤3.0), more preferably in a range of 2.3 to 3.0, still more preferably in a range of 2.60 to 3.0, particularly preferably in a range of 2.6 to 2.97, and most preferably in a range of 2.70 to 2.95 since the hardness improvement effect of the compound represented by General Formula (I) is strong.

In a case in which the cellulose acylate film in the optical film of the present invention is a laminate (multilayer configuration), in the cellulose acylate film, the total degrees of acyl substitution (A) of the cellulose acylate in the respective layers may be identical to or different from each other and multiple cellulose acylates may be present in a single layer in a mixed form.

In the acylation of cellulose, in a case in which an acid anhydride or an acid chloride is used as an acylating agent, as an organic solvent that is a reaction solvent, an organic acid, for example, acetic acid, methylene chloride, or the like is used.

As a catalyst, in a case in which the acylating agent is an acid anhydride, a protonic catalyst such as sulfuric acid is preferably used and, in a case in which the acylating agent is an acid chloride (for example, $CH_3CH_2COCl$), a basic compound is used.

The industrial synthesis method of a mixed aliphatic acid ester of the most ordinary cellulose is a method in which cellulose is acylated with an aliphatic acid (acetic acid, propionic acid, valeric acid, or the like), which corresponds to the acetyl group and other acyl groups, or a mixed organic acid component containing an acid anhydride thereof.

The cellulose acylate can be synthesized using the method described in, for example, JP1998-45804A (JP-H10-45804A).

In the film of the present invention, particularly, the cellulose acylate film used in the present invention, the content of the cellulose acylate in the total solid content is preferably in a range of 5% by mass to 99% by mass, more preferably in a range of 20% by mass to 99% by mass, and particularly preferably in a range of 50% by mass to 95% by mass from the viewpoint of water vapor permeability.

<3 Other Additives>

To the optical film of the present invention, particularly, to the cellulose acylate film, it is also possible to add additives such as a retardation adjuster (a retardation-developing agent and a retardation-reducing agent), a plasticizer of a polycondensed ester compound (polymer), a multivalent ester of a polyhydric alcohol, a phthalic acid ester, a phosphoric acid ester, or the like, furthermore, an ultraviolet absorber, an antioxidant, and a matting agent.

Meanwhile, in the present specification, regarding the expression of a compound group, there are cases in which the expression of a compound includes "-based", for example, such as a phosphoric acid ester-based compound; however, in the above-described case, this compound refers to the same phosphoric acid ester compound.

(Retardation-Reducing Agent)

In the present invention, as the retardation-reducing agent, it is possible to widely employ a phosphoric acid ester-based compound or a compound other than a non-phosphoric acid ester-based compound that is well known as an additive for the cellulose acylate film.

A polymer retardation-reducing agent is selected from phosphoric acid polyester-based polymers, styrene-based polymers, acrylic polymers, and copolymers thereof and acrylic polymers and styrene-based polymers are preferred. In addition, the optical film preferably includes at least one polymer having a negative intrinsic birefringence called a styrene-based polymer or an acrylic polymer.

A low-molecular-weight retardation-reducing agent, which is the compound other than a non-phosphoric acid ester-based compound, can be added as described below. The low-molecular-weight retardation-reducing agent may be a solid agent or an oil-phase agent. That is, the low-molecular-weight retardation-reducing agent is not particularly limited in terms of the melting point or the boiling point. For example, an ultraviolet-absorbing material having a melting point of 20° C. or lower and an ultraviolet-absorbing material having a melting point of 20° C. or higher may be mixed together or deterioration inhibitors may be mixed together in the same manner. Furthermore, an infrared-absorbing material is described in, for example, JP2001-194522A. In addition, the low-molecular-weight retardation-reducing agent may be added anytime during a step of producing a cellulose acylate solution (dope) and the low-molecular-weight retardation-reducing agent may be added by adding a step of adding the additives to the final producing step of the step of producing the dope. Furthermore, the amounts of the respective materials added are not particularly limited as long as functions can be developed.

The low-molecular-weight retardation-reducing agent, which is the compound other than a non-phosphoric acid ester-based compound, is not particularly limited and the details thereof is described in Paragraphs [0066] to [0085] of JP2007-272177A.

The compound represented by General Formula (1) described in Paragraphs [0066] to [0058] of JP2007-272177A can be obtained by the condensation reaction between a sulfonyl chloride derivative and an amino derivative as described in the publication.

The compound represented by General Formula (2) described in JP2007-272177A can be obtained by the dehydration condensation reaction between a carboxylic acid and an amine or the substitution reaction between a carboxylic acid chloride derivative and an amine derivative in which a condensation agent (for example, dicyclohexylcarbodiimide (DCC)) is used.

The retardation-reducing agent is more preferably a Rth-reducing agent since a preferred Nz factor is realized. Here, Rth refers to the retardation of the cellulose acylate film in the depth direction. Among retardation-reducing agents, examples of the Rth-reducing agent include acrylic polymers, styrene-based polymers, low-molecular compounds represented by General Formulae (3) to (7) described in JP2007-272177A and the like and, among these, acrylic polymers and styrene-based polymers are preferred and acrylic polymers are more preferred.

The amount of the retardation-reducing agent added is preferably in a range of 0.01 parts by mass to 30 parts by mass, more preferably in a range of 0.1 parts by mass to 20 parts by mass, and particularly preferably in a range of 0.1 parts by mass to 10 parts by mass in relation to 100 parts by mass of the cellulose acylate. When the amount added is set to 30 parts by mass or less, it is possible to improve the compatibility with a cellulose-based resin and to produce a film having excellent transparency. In a case in which two or more retardation-reducing agents are used, the total amount thereof is preferably in the above-described range.

(Retardation-Developing Agent)

The optical film of the present invention preferably includes at least one retardation-developing agent in order to develop the retardation value.

The retardation-developing agent is not particularly limited and examples thereof include an agent made of a rod-shaped or disc-shaped compound and, out of the above-described non-phosphoric acid ester-based compounds, compounds exhibiting retardation-developing properties. As the rod-shaped or disc-shaped compound, it is possible to preferably use a compound having at least two aromatic rings as the retardation-developing agent.

The amount of the retardation-developing agent made of a rod-shaped compound added is preferably in a range of 0.1 parts by mass to 30 parts by mass and more preferably in a range of 0.5 parts by mass to 20 parts by mass in relation to 100 parts by mass of the cellulose acylate. The amount of the disc-shaped compound in the retardation-developing agent added is preferably less than 3 parts by mass, more preferably less than 2 parts by mass, and particularly preferably less than 1 part by mass in relation to 100 parts by mass of the cellulose acylate.

Since the disc-shaped compound is superior to the rod-shaped compound in terms of the Rth retardation-developing properties, particularly, in a case in which a large Rth retardation is required, the disc-shaped compound is preferably used. Two or more retardation-developing agents may be jointly used.

The retardation-developing agent preferably has the maximum absorption wavelength in a wavelength range from 250 nm to 400 nm and preferably does not substantially absorb wavelengths in the visible light range.

The details of the retardation-developing agent are described in page 49 of Journal of Technical Disclosure No. 2001-1745.

[Plasticizer (Hydrophobizing Agent)]

In the optical film, particularly, in the cellulose acylate film, when a plasticizer is added to the cellulose acylate, the moisture content or water vapor permeability of the cellulose acylate film decreases and the hydrolysis reaction of the cellulose acylate caused by moisture in the cellulose acylate film is suppressed. Furthermore, the plasticizer is capable of suppressing the diffusion of the additives into a polarizer layer from the cellulose acylate film under high temperature and humidity conditions and improving the deterioration of polarizer performances. Therefore, in the present invention as well, the plasticizer is preferably used.

However, the plasticizer is originally used to soften a resin component and thus the use of the plasticizer, conversely, decreases the hardness of the cellulose acylate film.

Therefore, there is a demand for a plasticizer that decreases the moisture content and the water vapor permeability with the addition of a small amount thereof while not decreasing the glass transition temperature (Tg) of the cellulose acylate as much as possible, but there has been a limitation in providing the above-described performances and improving durability without causing a decrease in the hardness of the cellulose acylate film.

The compound represented by General Formula (I) of the present invention can be used as the plasticizer when being added to the optical film, particularly, to the cellulose acylate film. That is, it is possible not only to suppress the glass transition temperature and obtain the effect that improves durability including the reduction of the moisture content and the water vapor permeability as described above, simultaneously, but also to increase the hardness of the cellulose acylate film. Furthermore, the compound represented by General Formula (I) of the present invention can exhibit the hardness improvement effect even in a case in which the compound is jointly used with other ordinarily-used plasticizers and thus multiple plasticizers may be jointly used and added to the optical film and the cellulose acylate film.

In the present invention, among plasticizers, a polyester-based plasticizer which is clogged with an ester group that locationally comes closer to the plasticizer in the molecule is preferred. Specific examples of the polyester-based plasticizer include a multivalent ester compound of a polyhydric alcohol (hereinafter, referred to as a polyhydric alcohol ester-based plasticizer), a polycondensed ester compound (hereinafter, referred to as a polycondensed ester-based plasticizer), and a carbohydrate compound (hereinafter, referred to as a carbohydrate derivative-based plasticizer) and, in the present invention, these compounds are excellent in terms of developing the above-described plasticizer effect.

Hereinafter, the plasticizer used in the present invention will be described.

(Polyhydric Alcohol Ester-Based Plasticizer)

The polyhydric alcohol ester-based plasticizer used in the present invention is an ester in which the alcohol portion is derived from a polyhydric alcohol having two or more hydroxyl groups and the alcohol in the alcohol portion is preferably, in addition to a hydroxyl group, an alcohol in which saturated hydrocarbon that may be divided through an ether bond is substituted with two or more hydroxyl groups.

The polyhydric alcohol which is the raw material of the polyhydric alcohol ester-based plasticizer is represented by Formula (a) described below.

$$R\alpha\text{-}(OH)m \qquad \text{Formula (a):}$$

In Formula (a), $R\alpha$ represents a m-valent organic group and m represents a positive integer of 2 or more.

The number of carbon atoms in the polyhydric alcohol is preferably 5 or more and more preferably in a range of 5 to 20.

Examples of the polyhydric alcohol include a sugar alcohol and glycols.

Specifically, triethylene glycol, tetraethylene glycol, dipropylene glycol, tripropylene glycol, sorbitol, trimethylol propane, and xylitol are preferred.

The acid portion of the polyhydric alcohol ester (the acyl portion of the ester) is preferably an acid portion derived from a monocarboxylic acid. Examples of the above-described acid include an aliphatic monocarboxylic acid, an alicyclic monocarboxylic acid, and an aromatic monocarboxylic acid and the use of an alicyclic monocarboxylic acid or an aromatic monocarboxylic acid is preferred since water vapor-permeating properties and permanence properties are improved.

The number of carbon atoms in the aliphatic monocarboxylic acid is preferably in a range of 1 to 32, more preferably in a range of 1 to 20, and particularly preferably in a range of 1 to 10. When acetic acid is included, the compatibility with a cellulose derivative increases, which is preferable, and it is also preferable to mix acetic acid and other monocarboxylic acids and use the mixture.

Examples of the preferred aliphatic monocarboxylic acid include saturated aliphatic acids such as acetic acid, propionic acid, butyric acid, valeric acid, caproic acid, enanthic acid, caprylic acid, pelargonic acid, capric acid, 2-ethylhexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; unsaturated aliphatic acids such as undecylenic acid, oleic acid, sorbic acid, linoleic acid, linolenic acid, and arachidonic acid; and the like.

Examples of the preferred alicyclic monocarboxylic acid include cyclopentanecarboxylic acid, cyclohexanecarboxylic acid, cyclooctanecarboxylic acid, and derivatives thereof.

Examples of the preferred aromatic monocarboxylic acid include benzoic acid, acids obtained by introducing an alkyl group into the benzene ring of benzoic acid such as toluic acid, aromatic monocarboxylic acids having two or more benzene rings of biphenylcarboxylic acid, naphthalinecarboxylic acid, and tetralinecarboxylic acid, and derivatives thereof and benzoic acid is particularly preferred.

The molecular weight of the polyhydric alcohol ester-based plasticizer is not particularly limited, but is preferably in a range of 300 to 3000 and still more preferably in a range of 350 to 1500. The molecular weight is preferably large since sublimation from the optical film is excellently suppressed, but the molecular weight is preferably small in terms of water vapor-permeating properties and the compatibility with a cellulose derivative.

The polyhydric alcohol ester-based plasticizer is preferably, for example, the compound described in Paragraphs [0045] to [0049] of JP2012-234159A, which is preferably incorporated as a part of the present specification.

(Polycondensed Ester-Based Plasticizer)

The polycondensed ester-based plasticizer is obtained by polycondensing a divalent carboxylic acid compound and a diol compound.

The polycondensed ester-based plasticizer is preferably obtained by polycondensing at least one dicarboxylic acid represented by Formula (b) described below and at least one diol represented by Formula (c) described below.

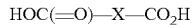         Formula (b):

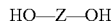         Formula (c):

In Formulae (b) and (c), X represents a divalent aliphatic group having 2 to 18 carbon atoms, a divalent aromatic group having 6 to 18 carbon atoms, or a divalent hetero ring having 2 to 18 carbon atoms and Z represents a divalent aliphatic group having 2 to 8 carbon atoms.

Here, the divalent aliphatic group having 2 to 8 carbon atoms may be straight or branched.

Examples of the divalent carboxylic acid compound represented by Formula (b) include an aliphatic carboxylic acid and an aromatic or heterocyclic carboxylic acid as described above and the divalent carboxylic acid compound is preferably an aliphatic carboxylic acid or an aromatic carboxylic acid.

Meanwhile, examples of the diol compound also include aromatic or heterocyclic compounds in addition to the aliphatic compounds represented by Formula (c).

Among these, a polycondensed ester-based plasticizer obtained from at least one dicarboxylic acid having an aromatic ring (also referred to as an aromatic dicarboxylic acid) and at least one aliphatic diol having 2.5 to 8.0 carbon atoms on average is preferred. In addition, a polycondensed ester-based plasticizer obtained from a mixture of an aromatic dicarboxylic acid and at least one aliphatic dicarboxylic acid and at least one aliphatic diol having 2.5 to 8.0 carbon atoms on average is also preferred.

The number-average molecular weight of the polycondensed ester-based plasticizer is preferably in a range of 500 to 2000, more preferably in a range of 600 to 1500, and still more preferably in a range of 700 to 1200. When the number-average molecular weight of the polycondensed ester-based plasticizer is 500 or more and preferably 600 or more, the polycondensed ester-based plasticizer becomes less volatile and film malfunction or step contamination caused by sublimation under a high-temperature condition during the stretching of the cellulose acylate film is excellently suppressed.

In addition, when the number-average molecular weight thereof is 2000 or less, the compatibility with the cellulose acylate becomes high and bleeding-out during the formation of a film and during heating and stretching is excellently suppressed.

In a case in which a mixture of an aromatic dicarboxylic acid and an aliphatic dicarboxylic acid is used as a dicarboxylic acid component, the average of the numbers of carbon atoms in the dicarboxylic acid component is preferably in a range of 5.5 to 10.0 and more preferably in a range of 5.6 to 8.0.

When the average of the numbers of carbon atoms is 5.5 or more, it is possible to obtain a polarizing plate having excellent durability. When the average of the number of carbon atoms is 10.0 or less, the compatibility with the cellulose acylate is excellent and bleeding-out during the film formation step of the cellulose acylate film is excellently suppressed.

Examples of an aromatic dicarboxylic acid that can be used in the synthesis of the polycondensed ester-based plasticizer include phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, 2,6-naphthalenedicarboxylic acid, and the like. Among these, phthalic acid, terephthalic acid and 2,6-naphthalenedicarboxylic acid are preferred, phthalic acid and terephthalic acid are more preferred, and terephthalic acid is still more preferred.

The polycondensed ester-based plasticizer obtained from a diol compound and a dicarboxylic acid including an aliphatic dicarboxylic acid includes an aliphatic dicarboxylic acid residue.

Examples of the aliphatic dicarboxylic acid that synthesizes the polycondensed ester-based plasticizer include oxalic acid, malonic acid, succinic acid, maleic acid, fumaric acid, glutaric acid, adipic acid, pimelic acid, suberic acid, azelaic acid, sebacic acid, dodecanedicarboxylic acid, 1,4-cyclohexanedicarboxylic acid, and the like.

Examples of the diol that synthesizes the polycondensed ester-based plasticizer include an aromatic diol and an aliphatic diol and, in the present invention, the polycondensed ester-based plasticizer is preferably synthesized using at least an aliphatic diol.

The polycondensed ester-based plasticizer preferably includes an aliphatic diol residue having 2.5 to 7.0 carbon atoms on average and more preferably includes an aliphatic diol residue having 2.5 to 4.0 carbon atoms on average.

When the average of the numbers of carbon atoms in the aliphatic diol residue is less than 7.0, the compatibility with the cellulose acylate is improved and the occurrence of planar failure, which is considered to be caused by bleeding-out, an increase in the heating loss of the compound, and the step contamination during the drying of a cellulose acylate web, is excellently suppressed. In addition, when the average of the numbers of carbon atoms in the aliphatic diol residue is 2.5 or more, the polycondensed ester-based plasticizer is easily synthesized.

The aliphatic diol used to synthesize the polycondensed ester-based plasticizer is preferably an alkyldiol or an alicyclic diol, for example, ethylene glycol, 1,2-propanediol, and 1,3-propanediol are preferred and ethylene glycol and 1,2-propanediol are more preferred.

The terminal of the polycondensed ester-based plasticizer may not be sealed and keep the diol or the carboxylic acid (that is, the polymer chain long terminal is —OH or $CO_2H$) and, furthermore, the so-called terminal sealing may be carried out by reacting a monocarboxylic acid or a monoalcohol. Meanwhile, when the terminal of the polycondensed ester-based plasticizer is sealed, the polycondensed ester-based plasticizer does not easily turn into a solid form at ordinary temperature and becomes favorably handled, and it is possible to obtain a cellulose acylate film having excellent humidity stability and polarizing plate durability.

The polycondensed ester-based plasticizer is preferably J-1 to J-38 that are described in Paragraphs [0062] to [0064] of JP2012-234159A.

(Carbohydrate Derivative-Based Plasticizer)

The carbohydrate derivative-based plasticizer is a derivative of a carbohydrate having a monosaccharide or 2 to 10 monosaccharide units and, among these, preferably an acylated plasticizer.

Examples of the carbohydrate having a monosaccharide or 2 to 10 monosaccharide units are preferably ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, and sorbitol, more preferably arabinose, xylose, glucose, fructose, mannose, galactose, maltose, cellobiose, sucrose, β-cyclodextrin, and γ-cyclodextrin, and particularly preferably xylose, glucose, fructose, mannose, galactose, maltose, cellobiose, sucrose, xylitol, and sorbitol.

Preferred examples of the carbohydrate derivative-based plasticizer include maltose octaacetate, cellobiose octaacetate, sucrose octaacetate, xylose tetrapropionate, glucose pentapropionate, fructose pentapropionate, mannose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, galactose pentabenzoate, maltose octabenzoate, cellobiose octabenzoate, sucrose octabenzoate, xylitol pentabenzoate, and sorbitol hexabenzoate.

The carbohydrate derivative-based plasticizer preferably has a pyranose structure or a furanose structure.

The carbohydrate derivative-based plasticizer is preferably the compound described in Paragraphs [0030] to [0039] of JP2012-234159A.

Meanwhile, in the present invention, the content described in Paragraphs [0026] to [0068] of JP2012-234159A is preferably applied to the plasticizer and the content described in the same paragraphs is preferably incorporated into a part of the present specification.

The amount of the plasticizer added is preferably in a range of 1% by mass to 20% by mass in relation to the cellulose acylate. When the amount added is 1% by mass or more, the polarizer durability improvement effect can be easily obtained and, when the amount added is 20% by mass or less, bleeding-out also does not easily occur. The amount added is more preferably in a range of 2% by mass to 15% by mass and particularly preferably in a range of 5% by mass to 15% by mass. Meanwhile, the number of the plasticizers being added may be two or more. In a case in which two or more plasticizers are added as well, the specific examples and preferred ranges of the amount added are the same as described above.

There is no particular limitation regarding when the plasticizer is added to the cellulose acylate film as long as the plasticizer is added when a film is formed. For example, the plasticizer may be added when the cellulose acylate is synthesized or the plasticizer may be mixed with the cellulose acylate when the dope is prepared.

(Antioxidant)

The optical film of the present invention preferably includes an antioxidant. The antioxidant can be added to the cellulose acylate solution. In the present invention, a well-known antioxidant, for example, a phenolic or hydroquinone-based antioxidant such as 2,6-di-t-butyl-4-methylphenol, 4,4'-thiobis-(6-t-butyl-3-methylphenol), 1,1'-bis(4-hydroxyphenyl)cyclohexane, 2,2'-methylenebis(4-ethyl-6-t-butylphenol), 2,5-di-t-butylhydroquinone, or pentaerythrityl-tetrakis[3-(3,5-di-t-butyl-4-hydroxyphenyl)propionate] can be added. Furthermore, a phosphorous-based antioxidant such as tris(4-methoxy-3,5-diphenyl)phosphite, tris(nonylphenyl)phosphite, tris(2,4-di-t-butylphenyl)phosphite, bis(2,6-di-t-butyl-4-methyphenyl)pentaerythritol diphosphite, or bis(2,4-di-t-butylphenyl)pentaerythritol diphosphite is preferably used. The amount of the antioxidant added is preferably in a range of 0.05 parts by mass to 5.0 parts by mass in relation to 100 parts by mass of the cellulose acylate.

(Ultraviolet Absorber)

From the viewpoint of preventing the deterioration of a polarizing plate or a liquid crystal, the optical film of the present invention may include an ultraviolet absorber. The ultraviolet absorber can be added to the cellulose acylate solution. In the present invention, the ultraviolet absorber which has an excellent absorption capability of ultraviolet rays having a wavelength of 370 nm or less and, from the viewpoint of favorable liquid crystal displaying properties, slightly absorbs visible light having a wavelength of 400 nm or more is preferably used. Examples of the ultraviolet absorber that is preferably used in the present invention include a hindered phenolic compound, a hydroxybenzophenone-based compound, a benzotriazole-based compound, a salicylate ester-based compound, a benzophenone-based compound, a cyanoacrylate-based compound, a nickel complex salt-based compound, and the like.

Examples of the hindered phenolic compound include 2,6-di-t-butyl-p-cresol, pentaerythrityl-tetrakis[3-(3,5-di-t-butyl-4-hydroxyphenyl)propionate], N,N'-hexamethylenebis(3,5-di-t-butyl-4-hydroxy-hydrocinnamide), 1,3,5-trimethyl-2,4,6-tris(3,5-di-t-butyl-4-hydroxybenzyl)benzene, tris(3,5-di-t-butyl-4-hydroxybenzyl)-isocyanurate, and the like.

Examples of the benzotriazole-based compound include 2-(2'-hydroxy-5'-methylphenyl)benzotriazole, 2,2-methylenebis[4-(1,1,3,3-tetramethylbutyl)-6-(2H-benzotriazole-2-yl)phenol], (2,4-bis-(n-octylthio)-6-(4-hydroxy-3,5-di-t-butylanilino)-1,3,5-triazine, triethyleneglycol-bis[3-(3-t-butyl-5-methyl-4-hydroxyphenyl)propionate], N,N'-hexamethylenebis(3,5-di-t-butyl-4-hydroxy-hydrocinnamide), 1,3,5-trimethyl-2,4,6-tris(3,5-di-t-butyl-4-hydroxybenzyl)benzene, 2-(2'-hydroxy-3',5'-di-t-butylphenyl)-5-chlorobenzotriazole, 2-(2'-hydroxy-3',5'-di-t-amylphenyl)-5-chlorobenzotriazole, 2,6-di-t-butyl-p-cresol, pentaerythrityl-tetakis[3-(3,5-di-t-butyl-4-hydroxyphenyl)propionate], and the like.

The amount of the ultraviolet inhibitor added is preferably in a range of 1 ppm to 1000 ppm and more preferably in a range of 10 ppm to 1000 ppm in terms of the mass proportion of the cellulose acylate film in the total solid content.

(Matting Agent)

A matting agent may be added to the optical film of the present invention from the viewpoint of film-sliding properties and stable production. The matting agent may be a matting agent of an inorganic compound or a matting agent of an organic compound.

The matting agent of an inorganic compound is preferably an inorganic compound containing silicon (for example, silicon dioxide, fired calcium silicate, hydrated calcium silicate, aluminum silicate, magnesium silicate, or the like), titanium oxide, zinc oxide, aluminum oxide, barium oxide, zirconium oxide, strontium oxide, antimony oxide, tin oxide, tin oxide-antimony, calcium carbonate, talc, clay, fired kaolin, or calcium phosphate and more preferably an inorganic compound containing silicon or zirconium oxide.

Silicon dioxide is particularly preferably used since silicon dioxide is capable of reducing the turbidity of the cellulose acylate film.

As the fine particles of silicon dioxide, commercially available products having trade names of, for example, AEROSIL R972, R974, R812, 200, 300, R202, OX50, TT600 (all manufactured by Nippon Aerosil Co., Ltd.), and the like can be used. As the fine particles of zirconium oxide, commercially available products having trade names of, for example, AEROSIL R976 and R811 (all manufactured by Nippon Aerosil Co., Ltd.), and the like can be used.

The matting agent of an organic compound is preferably, for example, a polymer such as a silicone resin, a fluorocarbon resin, and an acrylic resin and, among these, a silicone resin is preferred. Among silicone resins, a silicone resin having a three-dimensional network structure is particularly preferred and commercially available products having trade names of, for example, TOSPEARL 103, TOSPEARL 105, TOSPEARL 108, TOSPEARL 120, TOSPEARL 145, TOSPEARL 3120, and TOSPEARL 240 (all manufactured by Toshiba Silicone Co. Ltd.) can be used.

In a case in which the matting agent is added to the cellulose acylate solution, there is no particular limitation regarding the method for adding the matting agent and any method can be used as long as a desired cellulose acylate solution can be obtained. For example, additives may be added in a step of mixing the cellulose acylate and a solvent or additives may be added after a mixed solution is produced using the cellulose acylate and a solvent.

Furthermore, additives may be added and mixed in immediately before the dope is cast, which is a so-called add-immediately-before method, and screw-type kneading machine is installed and used online. Specifically, a static mixer such as an inline mixer is preferred and the inline mixer is preferably, for example, a static mixer SWJ (Toray static pipe mixer Hi-Mixer) (manufactured by Toray Engineering Co., Ltd.).

Meanwhile, regarding the inline addition, in order to remove concentration unevenness, the aggregation of the particles, and the like, JP2003-053752A describes a method for removing concentration unevenness and the aggregation of matting particles or the like by, in a method for producing a cellulose acylate film, setting the distance L between the addition nozzle front end, at which an additive solution having a different composition is mixed into the main raw material dope, and the starting end portion of the inline mixer to be five times or less of the inner diameter d of the main raw material pipe. As a more preferred aspect, it is described that the distance (L) between the front end opening portion of the supply nozzle of the additive solution having a different composition from the main raw material dope and the starting end portion of the inline mixer is set to be ten times or less of the inner diameter (d) of the front end opening portion of the supply nozzle and the inline mixer is a static non-stirring-type pipe mixer or a dynamic stirring-type pipe mixer. More specifically, it is disclosed that the flow rate ratio of the main raw material dope for the cellulose acylate film/the inline additive solution is in a range of 10/1 to 500/1 and preferably in a range of 50/1 to 200/1. Furthermore, in JP2003-014933A as well, which aims for a phase difference film in which the bleeding-out of additives is small, an interlayer peeling phenomenon does not occur, furthermore, the sliding properties are favorable, and the transparency is excellent, and, as the method for adding additives, it is described that additives may be added to a dissolution tank or additives or a solution in which additives are dissolved or dispersed may be added to the dope, which is being fed, somewhere between the dissolution tank to a co-casting die; however, since the miscibility is enhanced in the latter case, mixing means such as a static mixer is preferably provided.

The proportion of the matting agent in the cellulose acylate film is particularly preferably in a range of 0.05% by mass to 1.0% by mass. When the proportion is set in the above-described range, the haze of the cellulose acylate film does not become large and, in a case in which an LCD is actually used, the matting agent contributes to the suppression of disadvantages such as the degradation of contrast and the generation of bright spots. In addition, it is possible to realize squeaking prevention and abrasion resistance. From the above-described viewpoint, the proportion of the matting agent is particularly preferably in a range of 0.05% by mass to 1.0% by mass.

<4 Properties of Cellulose Acylate Film>

(Hardness)

Regarding the surface hardness, the Knoop hardness measured using the Knoop method in which a Knoop indenter is used is preferably high and the pencil hardness is also preferably high. The Knoop hardness can be measured using a hardness meter having a Knoop indenter as an indenter, for example, "a FISCHER SCOPE H100Vp-type hardness meter" manufactured by Fischer Instruments K.K. Japan.

The pencil hardness can be evaluated using, for example, a testing pencil regulated by JIS-S6006 and the evaluation method for pencil hardness regulated by JIS-K5400.

The compound represented by General Formula (I) of the present invention is capable of increasing the hardness, such as the Knoop hardness, of the cellulose acylate film and the hardness can be adjusted using the kind or content of the compound represented by General Formula (I).

[Modulus of Elasticity (Modulus of Tensile Elasticity)]

The cellulose acylate film preferably exhibits a sufficient modulus of elasticity (modulus of tensile elasticity) in terms of practical use. There is no particular limitation regarding the range of the modulus of elasticity; however, from the viewpoint of manufacturing aptitude and handling capability, the modulus of elasticity is preferably in a range of 1.0 GPa to 5.0 GPa and more preferably in a range of 2.0 GPa to 5.0 GPa. When added to the cellulose acylate film, the compound represented by General Formula (I) of the present invention has an action of making the cellulose acylate film hydrophobic so as to improve the modulus of elasticity, which is also an advantage of the present invention.

(Photoelastic Coefficient)

The absolute value of the photoelastic coefficient of the cellulose acylate film is preferably $8.0 \times 10^{12}$ $m^2/N$ or less, more preferably $6 \times 10^{-12}$ $m^2/N$ or less, and still more preferably $5 \times 10^{-12}$ $m^2/N$ or less. When the photoelastic coefficient of the cellulose acylate film is decreased, it is possible to suppress the occurrence of unevenness at a high temperature and a high humidity when the optical film of the present invention including the cellulose acylate film is combined into a liquid crystal display device as a polarizing plate protective film. The photoelastic coefficient is measured and computed using the following methods unless particularly otherwise described.

The lower limit value of the modulus of photoelasticity is not particularly limited, but is realistically $0.1 \times 10^{-12}$ $m^2/N$ or more.

A piece (3.5 cm×12 cm) of the cellulose acylate film is cut out, the retardation (Re) thereof is measured using an ellipsometer (M150 [trade name], JASCO Corporation) under a load of 0 g, 250 g, 500 g, 1000 g, and 1500 g respectively, and the photoelastic coefficient is measured through computation from the slope of a straight line of the Re change corresponding to stress.

(Moisture Content)

The moisture content of the cellulose acylate film can be evaluated by measuring the equilibrium moisture content at a certain temperature and a certain humidity. The equilibrium moisture content is obtained by leaving the cellulose acylate film to stand at the above-described certain temperature and the above-described certain humidity for 24 hours, then, measuring the amount of moisture in a specimen that reaches the equilibrium using the Karl Fischer method, and dividing the amount (g) of moisture by the mass (g) of the specimen.

The moisture content of the cellulose acylate film at 25° C. and a relative humidity of 80% is preferably 5% by mass or less, more preferably 4% by mass or less, and still more preferably less than 3% by mass. When the moisture content of the cellulose acylate film is decreased, it is possible to suppress the occurrence of the display unevenness in a liquid crystal display device at a high temperature and a high humidity when the optical film of the present invention including the cellulose acylate film is combined into a liquid crystal display device as a polarizing plate protective film. The lower limit value of the moisture content is not particularly limited, but is realistically 0.1% by mass or more.

(Water Vapor Permeability)

The water vapor permeability of the cellulose acylate film can be evaluated by measuring the mass of water vapor passing through a specimen within 24 hours in an atmosphere of a temperature of 40° C. and a relative humidity of 90% RH according to the water vapor permeability test (cup method) of JIS Z0208 and converting the mass to a value per square meter of the specimen area.

The water vapor permeability of the cellulose acylate film is preferably in a range of 500 g/m$^2$·day to 2000 g/m$^2$·day, more preferably in a range of 900 g/m$^2$-day to 1300 g/m$^2$·day, and particularly preferably in a range of 1000 g/m$^2$-day to 1200 g/m$^2$·day.

(Haze)

The haze of the cellulose acylate film is preferably 1% or less, more preferably 0.7% or less, and particularly preferably 0.5% or less. When the haze is set to the above-described upper limit value or less, it is advantageous that the transparency of the cellulose acylate film becomes higher and the cellulose acylate film becomes more easily available as an optical film. The haze refers to a value measured and computed using the following method unless particularly otherwise described. The lower limit value of the haze is not particularly limited, but is realistically 0.001% or more.

The haze of a 40 mm×80 mm cellulose acylate film is measured using a haze meter (HGM-2DP, Suga tester) under an environment of 25° C. and a relative humidity of 60% according to JIS K7136.

(Film Thickness)

The average film thickness of the cellulose acylate film is preferably in a range of 5 μm to 100 μm, more preferably in a range of 8 μm to 80 μm, and still more preferably in a range of 10 μm to 70 μm. When the average film thickness is set to 10 μm or more, the handling capability for producing a web-shaped film is improved, which is preferable. In addition, when the average film thickness is set to 70 μm or less, it is easy to cope with the humidity change and maintain the optical characteristics.

In addition, in a case in which the cellulose acylate film has a laminate structure of three or more layers, the film thickness of the core layer is preferably in a range of 3 μm to 70 μm and more preferably in a range of 5 μm to 60 μm, and the film thicknesses of the skin layer A and the skin layer B are both preferably in a range of 0.5 μm to 20 μm, more preferably in a range of 0.5 μm to 10 μm, and particularly preferably in a range of 0.5 μm to 3 μm.

(Width)

The width of the cellulose acylate film is preferably in a range of 700 mm to 3000 mm, more preferably in a range of 1000 mm to 2800 mm, and particularly preferably in a range of 1300 mm to 2500 mm.

<5 Method for Manufacturing Cellulose Acylate Film>

A method for manufacturing the cellulose acylate film of the present invention is not particularly limited, but the cellulose acylate film is preferably manufactured using a melting film formation method or a solvent cast method. The cellulose acylate film is more preferably manufactured using the solvent cast method. Regarding examples of the manufacturing of the cellulose acylate film using the solvent cast method, it is possible to reference the respective specifications of U.S. Pat. Nos. 2,336,310A, 2,367,603A, 2,492,078A, 2,492,977A, 2,492,978A, 2,607,704A, 2,739,069A, and 2,739,070A, the respective specifications of UK640731A and UK736892A, and the respective publications of JP1970-4554B (JP-S45-4554B), JP1974-5614B (JP-S49-5614B), JP1985-176834A (JP-S60-176834A), JP1985-203430A (JP-S60-203430A), JP1987-115035A (JP-S62-115035A), and the like. In addition, a stretching treatment may be carried out on the cellulose acylate film. Regarding the method and conditions for a stretching treatment, it is possible to reference, for example, the respective publications of JP1987-115035A (JP-S62-115035A), JP1992-152125A (JP-H4-152125A), JP1992-284211A (JP-H4-284211A), JP1992-298310A (JP-H4-298310A), and JP1999-48271A (JP-H11-48271A).

(Casting Method)

As the casting method of the solution, there are a method in which the prepared dope is uniformly extruded onto a metal support from a pressurization die, a doctor blade method in which the film thickness is adjusted using a blade with respect to the dope temporarily cast on a metal support, a reverse roll coater method in which adjustment is made using a reversely-rotating roll, and the like and the pressurization die method is preferred. There are a coat hanger-type die, a T die-type die, and the like as the pressurization die and all dies can be preferably used. Furthermore, in addition to the methods described above, a variety of methods known in the related art, in which the cellulose acylate solution is cast so as to form a film, can be carried out and it is possible to cast the cellulose acylate solution and form a film in the same manner as in the related art by setting individual conditions in consideration of the differences of the boiling points and the like of solvents being used.

Co-Casting

For the formation of the cellulose acylate film, a lamination casting method such as a co-casting method, a sequential casting method, or a coating method is preferably used and a simultaneous co-casting method is particularly preferably used from the viewpoint of stable production and a decrease in the production costs.

In a case in which the cellulose acylate film is manufactured using a co-casting method or a sequential casting method, first, cellulose acylate solutions (dopes) for individual layers are prepared. The co-casting method (superimposition simultaneous casting) is a casting method in which casting dopes for individual layers (which may be three or less layers) are extruded from a casting die that extrudes the dopes from separate slits at the same time on a casting support (band or drum), the individual layers are cast at the same time, are peeled off from the support at an appropriate timing, and are dried, thereby forming a film.

The sequential casting method is a casting method in which, if necessary, dopes for three or more layers are sequentially cast and laminated in a manner in which, first, a casting dope for the first layer is extruded from a casting die on a casting support, is cast, and is dried or not dried, then, a casting dope for the second layer is extruded from the casting die thereon and is cast, and the layers are peeled off from the support at an appropriate timing, and are dried, thereby forming the cellulose acylate film. The coating method is a method in which, generally, a core layer is shaped in a film shape using the solvent cast method, a coating fluid that is applied onto a surface layer is prepared, and the coating fluid is applied onto both surfaces of the core layer one by one or at the same time using an appropriate coater, and is dried, thereby forming the cellulose acylate film having a laminate structure.

As the endlessly-running metal support that is used to manufacture the cellulose acylate film, a drum having a surface that is mirror-finished through chromium plating or a stainless steel belt (which may also be called a band) that is mirror-finished through surface polishing is used. Regarding the pressurization die being used, one or more dies may be installed above the metal support. The preferred number of the dies is one or two. In a case in which two or more dies are installed, the amount of the dope being cast may be divided into a variety of proportions and be assigned to the respective dies or the dope may be fed to the dies at individual proportions from multiple precise metering gear pumps. The temperature of the dope (resin solution) being used for casting is preferably in a range of −10° C. to 55° C. and more preferably in a range of 25° C. to 50° C. In that case, all the solution temperatures in a step may be identical to one another or the temperatures may be different at individual positions in a step. In a case in which the temperatures are different, the temperatures need to be desired temperatures immediately before casting.

In addition, there is no particular limitation regarding the material of the metal support, but SUS (for example, SUS316) is more preferred.

(Peeling)

The method for manufacturing the cellulose acylate film preferably includes a step of peeling the film formed from the dope off from the metal support. There is no particular limitation regarding the peeling method in the method for manufacturing the cellulose acylate film and, in a case in which a well-known method is used, it is possible to improve the peeling properties.

(Stretching Treatment)

The method for manufacturing the cellulose acylate film preferably includes a step of stretching the film after the formation of the film. The stretching direction of the cellulose acylate film may be any of the cellulose acylate film transportation direction (longitudinal direction) and a direction orthogonal to the transportation direction (transverse direction), but is particularly preferably the direction orthogonal to the cellulose acylate film transportation direction (transverse direction) from the viewpoint of the following polarizing plate-working process in which the cellulose acylate film is used.

The method for stretching the film in the transverse direction is described in, for example, the respective publications of JP1987-115035A (JP-S62-115035A), JP1992-152125A (JP-H4-152125A), JP1992-284211A (JP-H4-284211A), JP1992-298310A (JP-H4-298310A), JP1999-48271A (JP-H11-48271A), and the like. In the case of the stretching in the longitudinal direction, when the winding speed of the cellulose acylate film is set to be faster than the peeling speed of the cellulose acylate film by adjusting the speed of the transportation roller of the cellulose acylate film, the cellulose acylate film is stretched. In the case of the stretching in the transverse direction, a belt of the cellulose acylate film is transported while being held with tenters and the belt between the tenters is gradually widened, whereby the cellulose acylate film can be stretched. It is also possible to stretch the cellulose acylate film using a stretching machine (preferably, uniaxially stretch the film using a long stretching machine) after the drying of the film.

In a case in which the cellulose acylate film is used as a protective film for a polarizer, in order to suppress light leakage observed when a polarizing plate is obliquely viewed, it is necessary to dispose the transmission axis of the polarizer and the in-plane slow axis of the cellulose acylate film in parallel. Since the transmission axis of a roll-film-shaped polarizer that is continuously manufactured is generally in parallel with the width direction of the roll film, in order to continuously attach the roll film-shaped polarizer and a protective film made of the roll film-shaped cellulose acylate film to each other, the in-plane slow axis of the roll film-shaped protective film needs to be in parallel with the width direction of the cellulose acylate film. Therefore, it is preferable to stretch the film more in the width direction. In addition, the stretching treatment may be carried out in the middle of the film-forming step or the original fabric obtained by forming and winding a film may be stretched.

The stretching in the transverse direction is preferably the stretching of 5% to 100%, more preferably the stretching of 5% to 80%, and particularly preferably the stretching of 5% to 40%. Meanwhile, an unstretched film means that the drawing of the film is 0%. The stretching treatment may be carried out in the middle of the film-forming step or the original fabric obtained by forming and winding a film may be stretched. In the former case, the stretching may be carried out in a state in which the residual solvent is included and it is possible to preferably stretch the film with the amount of the residual solvent=(the mass of the residual volatile component/the mass of the film after a heating treatment)×100% in a range of 0.05% to 50%. It is particularly preferable to stretch the film 5% to 80% in a state in which the amount of the residual solvent is in a range of 0.05% to 5%.

(Drying)

The method for manufacturing the cellulose acylate film preferably includes a step of drying the cellulose acylate film and a step of stretching the dried cellulose acylate film at a temperature of (the glass transition temperature (Tg)—10° C. or more) from the viewpoint of the retardation developing properties.

For the drying of the dope on the metal support in relation to the manufacturing of the cellulose acylate film, generally, a method in which hot air is blown from the front surface of the metal support (drum or belt), that is, the front surface of the web present on the metal support, a method in which hot air is brown from the rear surface of the drum or the belt, a rear surface liquid heat conduction method in which a liquid having a controlled temperature is brought into contact with the rear surface, which is on the side opposite to the dope-cast surface of the drum or the web, and the drum or the belt is heated through heat conduction, thereby controlling the surface temperature, or the like are used and the rear surface liquid heat conduction method is preferred. The surface temperature of the metal support before being cast does not matter as long as the temperature is equal to or lower than the boiling point of a solvent used in the dope. However, in order to accelerate the drying and, in addition, eliminate fluidity on the metal support, the surface temperature of the metal support is preferably set to a temperature that is 1° C. to 10° C. lower than the boiling point of a solvent having the lowest boiling point among solvents used. Meanwhile, in a case in which the casting dope is peeled off without being cooled and dried, what has been described above does not apply.

Regarding the adjustment of the thickness of the cellulose acylate film, it is possible to adjust the concentration of the solid content included in the dope, the slit gaps between die caps, the extrusion pressure from the die, the speed of the metal support, and the like so as to obtain a desired thickness.

Regarding the length of the cellulose acylate film obtained as described above, the length of the cellulose acylate film wound per roll is preferably in a range of 100 m to 10000 m, more preferably in a range of 500 m to 7000 m, and still more preferably in a range of 1000 m to 6000 m. During winding, at least one end is preferably knurled. The width of the knurling is preferably in a range of 3 mm to 50 mm and more preferably in a range of 5 mm to 30 mm, and the height of the knurling is preferably in a range of 0.5 μm to 500 μm and more preferably in a range of 1 μm to 200 μm. The above-described knurling may be supplied to either or both surfaces.

Generally, in a large-screen display device, since the degradation of contrast and discoloration become significant in an oblique direction, the optical film of the present invention made of the cellulose acylate film and the optical film of the present invention including the cellulose acylate film are suitable for, particularly, the use in large-screen liquid crystal display devices. In a case in which the cellulose acylate film is used as an optical compensation film for a large-screen liquid crystal display device, for example, the cellulose acylate film is preferably shaped with the width of the film set to 1470 mm or more. In addition, the aspect of a polarizing plate protective film of the present invention includes not only an aspect in which the optical film is cut into film pieces small enough to be combined into a liquid crystal display device but also an aspect in which the optical film is produced to be long through continuous production and is wound in a roll shape. The latter aspect of the polarizing plate protective film is stored, transported, and the like in the as-it-is state and, when actually combined into a liquid crystal display device or attached to a polarizer or the like, the film is cut into a desired size and is used. In addition, the polarizing plate protective film is attached to a polarizer or the like made of a polyvinyl alcohol film or the like produced to be long in the same manner in a state of a long length and then is cut into a desired size and is used when actually combined into a liquid crystal display device. An aspect of the optical compensation film wound in a roll shape is a film wound in a roll shape having a roll length of 2500 m or longer.

<<Hard Coat Layer>>

In the optical film of the present invention, the hard coat layer provided on the cellulose acylate film as desired is a layer for imparting hardness or abrasion resistance to the optical film of the present invention. For example, when a coating composition for forming the hard coat layer is applied onto the cellulose acylate film and is cured, it is possible to form a hard coat layer that is highly adhesive to the cellulose acylate film in association with the compound represented by General Formula (I). When a filler or additives are added to the hard coat layer, it is also possible to impart mechanical, electrical, optical and physical performances or chemical performances such as water repellent or oil repellent properties to the hard coat layer. The thickness of the hard coat layer is preferably in a range of 0.1 μm to 6 μm and more preferably in a range of 3 μm to 6 μm. When the optical film includes a thin hard coat layer having a thickness in the above-described range, the optical film include the hard coat layer in which the improvement of properties such as the suppression of brittleness or curling, weight reduction, and the reduction of production costs are achieved.

The hard coat layer is preferably formed by curing a curable composition for forming the hard coat layer. The curable composition is preferably prepared in a form of a liquid-phase coating composition. An example of the coating composition contains a monomer or oligomer for a matrix-forming binder, a polymer, and an organic solvent. When the coating composition is applied and then cured, the hard coat layer can be formed. For the curing, a crosslinking reaction or a polymerization reaction can be used.

(Monomer or Oligomer for Matrix-Forming Binder)

Examples of an available monomer or oligomer for a matrix-forming binder include ionizing radiation-curable polyfunctional monomers and polyfunctional oligomers. The polyfunctional monomer and the polyfunctional oligomers are preferably monomers capable of a crosslinking reaction and a polymerization reaction. The functional group in the ionizing radiation-curable polyfunctional monomer or polyfunctional oligomer is preferably a photopolymerizable, electron beam-polymerizable, or radiation-polymerizable group and, among these, a photopolymerizable functional group is preferred.

Examples of the photopolymerizable functional groups include unsaturated polymerizable functional groups such as a (meth)acryloyl group, a vinyl group, a styryl group, and an allyl group and ring-opening polymerization-type polymerizable functional groups such as an epoxy-based compound and, among these, a (meth)acryloyl group is preferred.

Specific examples of the photopolymerizable polyfunctional monomer having a photopolymerizable functional group include (meth)acrylic acid diesters of alkylene glycols such as neopentyl glycol acrylate, 1,6-hexanediol(meth)acrylate, and propylene glycol di(meth)acrylate;

(meth)acrylic acid diesters of polyoxyalkylene glycols such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohols such as pentaerythritol di(meth)acrylate;

(meth)acrylic acid diesters of ethylene oxides or propylene oxide adducts such as 2,2-bis{4-(acryloxy.diethoxy) phenyl}propane, and 2,2-bis{4-(acryloxy.polypropoxy) phenyl}propane;

and the like.

Furthermore, urethane(meth)acrylates, polyester(meth) acrylates, isocyanuric acid acrylates, and epoxy(meth)acrylates are also preferably used as the photopolymerizable polyfunctional monomers.

Among these, esters of a polyhydric alcohol and a (meth) acrylic acid are preferred and polyfunctional monomers having three or more (meth)acryloyl groups in a molecule are more preferred.

Specific examples thereof include (di)pentaerythritol tri (meth)acrylate, (di)pentaerythritol tetra(meth)acrylate, (di)

pentaerythritol penta(meth)acrylate, (di)pentaerythritol hexa (meth)acrylate, tripentaerythritol triacrylate, tripentaerythritol hexatriacrylate, trimethylolpropane tri (meth)acrylate, trimethylolethane tri(meth)acrylate, ditrimethylolpropane tetra(meth)acrylate, EO-denatured trimethylolpropane tri(meth)acrylate, PO-denatured trimethylolpropane tri(meth)acrylate, EO-denatured phosphoric acid tri(meth)acrylate, 1,2,4-cyclohexane tetra(meth)acrylate, pentaglycerol triacrylate, 1,2,3-cyclohexane tetramethacrylate, polyester polyacrylate, caprolactone-denatured tris(acryloxyethyl)isocyanurate, and the like.

In the present specification, "(meth)acrylate", "(meth)acrylic acid", and "(meth)acryloyl" respectively indicate "acrylate or methacrylate", "acrylic acid or methacrylic acid", and "acryloyl or methacryloyl".

Furthermore, examples thereof include resins having three or more (meth)acryloyl groups, for example, polyester resins having a relatively low molecular weight, polyether resins, acrylic resins, epoxy resins, urethane resins, alkyd resins, spiroacetal resins, polybutadiene resins, polythiolpolyene resins, oligomers or prepolymers of polyfunctional compounds and the like such as polyhydric alcohols, and the like.

Regarding the specific compounds of polyfunctional acrylate-based compounds having three or more (meth)acryloyl groups, it is possible to reference Paragraphs [0096] and the like in JP2007-256844A.

Examples of the urethane(meth)acrylates include urethane(meth)acrylate-based compounds obtained by reacting hydroxyl group-containing compounds such as an alcohol, a polyol, and/or a hydroxyl group-containing (meth)acrylate and an isocyanate and, if necessary, esterifying a polyurethane compound obtained by the above-described reaction with a (meth)acrylic acid.

Regarding specific examples of the specific compounds, it is possible to reference the description of Paragraphs [0017] and the like in JP2007-256844A.

When an isocyanuric acid (meth)acrylate is used, it is possible to further suppress curling, which is preferable. Examples of the isocyanuric acid (meth)acrylate include isocyanuric acid diacrylates and isocyanuric acid triacrylates and, regarding examples of the specific compounds, it is possible to reference Paragraphs [0018] to [0021] in JP2007-256844A.

In the hard coat layer, furthermore, it is possible to use an epoxy-based compound in order to reduce shrinkage caused by curing. As monomers having an epoxy group for configuring the epoxy-based compound, monomers having two or more epoxy groups in one molecule are used and examples thereof include the epoxy-based monomers described in the respective publications of JP2004-264563A, JP2004-264564A, JP2005-37737A, JP2005-37738A, JP2005-140862A, JP2005-140862A, JP2005-140863A, JP2002-322430A, and the like. In addition, it is also preferable to use a compound having both an epoxy-based functional group and an acrylic functional group such as glycidyl(meth)acrylate.

(Polymer Compound)

The hard coat layer may include a polymer compound. When a polymer compound is added, it is possible to diminish curing shrinkage, to superiorly carry out the adjustment of the viscosity of the coating fluid in relation to the dispersion stability (aggregation properties) of resin particles, and, furthermore, to control the polarity of a solidified substance in the drying step so as to change the aggregation behaviors of the resin particles or reduce drying unevenness in the drying step, which is preferable.

The polymer compound already forms a polymer when being added to the coating fluid and, as an example of the polymer compound, resins such as cellulose esters (for example, cellulose triacetate, cellulose diacetate, cellulose propionate, cellulose acetate propionate, cellulose acetate butyrate, cellulose nitrate, and the like), urethanes, polyesters, (meth)acrylic acid esters (for example, methyl methacrylate/methyl(meth)acrylate copolymers, methyl methacrylate/ethyl(meth)acrylate copolymers, methyl methacrylate/butyl(meth)acrylate copolymers, methyl methacrylate/styrene copolymers, methyl methacrylate/(meth)acrylic acid copolymers, polymethyl methacrylate, and the like) and polystyrene are preferably used.

<Curable Composition>

An example of the curable composition that can be used for the formation of the hard coat layer is a curable composition including a (meth)acrylate-based compound. The curable composition preferably includes a photoradical polymerization initiator or a thermoradical polymerization initiator together with the (meth)acrylate-based compound and may further include a filler, a coating aid, and other additives as desired. The curable composition can be cured by progressing a polymerization reaction through the radiation of ionizing radiation or heating in the presence of a photoradical polymerization initiator or a thermoradical polymerization initiator. It is also possible to carry out both ionizing radiation curing and thermocuring. As the photo or thermo polymerization initiator, commercially available compounds can be used and these are described in "Advanced UV curing techniques" (p. 159, publisher: Kazuhiro Takasuki, publishing company: Technical Information institute Co., Ltd., published on 1991) or the catalog of Ciba Specialty Chemicals Inc.

Another example of the curable composition that can be used for the formation of the hard coat layer is a curable composition including an epoxy-based compound. The curable composition preferably includes a photo-acid-generating agent that generates cations through the actions of light together with an epoxy-based compound and may further include a filler, a coating aid, and other additives as desired. The curable composition can be cured by progressing a polymerization reaction through the radiation of light in the presence of a photo-acid-generating agent. Examples of the photo-acid-generating agent include an ionic compound such as a triaryl sulfonium salt or a diaryl iodonium salt and a nonionic compound such as a nitrobenzyl ester of sulfonic acid and a variety of well-known photo-acid-generating agents such as the compounds described in The Japanese Research Association for Organic Electronic Materials' "Organic Materials for Imaging" published by Bunshin Design Printing Publishing And Digital Communications (1997) and the like can be used.

In addition, the (meth)acrylate-based compound and the epoxy-based compound may be jointly used and, in that case, as the initiators, it is preferable to jointly use the photoradical polymerization initiator or the thermoradical polymerization initiator and a photocationic polymerization initiator.

The curable composition that is particularly preferred for the formation of the hard coat layer is a composition including the (meth)acrylate-based compound as used in examples described below.

The curable composition is preferably prepared as a coating fluid. The coating fluid can be prepared by dissolving and/or dispersing the above-described components in an organic solvent.

(Properties of Hard Coat Layer)

The hard coat layer formed on the cellulose acylate film in the optical film of the present invention is highly adhesive to the cellulose acylate film. Particularly, in the hard coat layer formed of the above-described preferred curable composition on the cellulose acylate film including the compound represented by General Formula (I), the curable composition is formed to be more adhesive to the cellulose acylate film in association with the compound represented by General Formula (I). Therefore, the optical film including the above-described cellulose acylate film and the above-described hard coat layer maintains the adhesiveness between the cellulose acylate film and the hard coat layer through the radiation of light or the like and has excellent light durability.

The hard coat layer preferably has excellent abrasion resistance. Specifically, in a case in which a pencil hardness test, which serves as an index of abrasion resistance, is carried out, the hard coat layer preferably achieves 3H or higher and more preferably achieves 4H or higher.

[Polarizing Plate]

A polarizing plate of the present invention includes at least a polarizer and the optical film of the present invention. The polarizing plate of the present invention preferably includes a polarizer and the optical films of the present invention on one or both surfaces of the polarizer. As the polarizer, an iodine-based polarizer, a dye-based polarizer in which a dichromatic dye is used, or a polyene-based polarizer is used. Generally, the iodine-based polarizer and the dye-based polarizer are manufactured using a polyvinyl alcohol-based film. In a case in which the optical film of the present invention is used as a polarizing plate protective film, there is no particular limitation regarding the method for manufacturing the polarizing plate and the polarizing plate can be produced using an ordinary method. Examples thereof include a method in which the cellulose acylate film in the optical film of the present invention is alkali-treated and is attached to both surfaces of a polarizer produced by immersing and stretching a polyvinyl alcohol film in an iodine solution using an aqueous solution of a fully-saponified polyvinyl alcohol. Instead of the alkali treatment, the easy adhesion work as described in JP1994-94915A (JP-H6-94915A) and JP1994-118232A (JP-H6-118232A) may be carried out. Examples of an adhesive used to attach the treated surface of the cellulose acylate film and the polarizer to each other include a polyvinyl alcohol-based adhesive such as a polyvinyl alcohol or a polyvinyl butyral, a vinyl-based latex such as a butyl acrylate, and the like.

The method for attaching the optical film of the present invention to the polarizer is preferably to attach the optical film of the present invention and the polarizer so that the transmission axis of the polarizer and the slow axis of the optical film of the present invention are substantially orthogonal or parallel to each other or form 45 degrees. In a liquid crystal display device of the present invention, the transmission axis of the polarizing plate and the slow axis of the optical film of the present invention are preferably substantially orthogonal to each other. Here, "being substantially orthogonal" means that the direction of the main refractive index nx of the optical film of the present invention intersects the direction of the transmission axis of the polarizing plate at an angle of 90°±10° and the intersection angle is preferably 90°±5° and more preferably 90°±1°. When the intersection angle is set in the above-described range, it is possible to further reduce light leakage under a polarizing plate cross Nicol. The slow axis can be measured using a variety of well-known methods and can be measured using, for example, a birefringence meter (KOBRADH, manufactured by Oji Scientific Instruments).

The aspect of the polarizing plate of the present invention includes not only an aspect in which the polarizing plate is cut into film pieces small enough to be combined into a liquid crystal display device but also an aspect in which the polarizing plate is produced to be long through continuous production and is wound in a roll shape (for example, an aspect in which the roll length is 2500 m or longer or 3900 m or longer). In order to use the polarizing plate in a large-screen liquid crystal display device, the width of the polarizing plate is preferably set to 1470 mm or more. As the specific configuration of the polarizing plate of the present invention, there is no particular limitation and a well-known configuration can be employed. For example, it is possible to employ the configuration illustrated in FIG. 6 of JP2008-262161A.

<<Display Device>>

The present invention is preferably used for an application of a display device in which a polarizer is used.

Examples of the above-described display device include antireflection applications and the like for a liquid crystal display device or an organic electroluminescence display device.

A liquid crystal display device can be described as an example. The liquid crystal display device of the present invention includes at least a liquid crystal cell and the polarizing plate of the present invention. In a case that polarizing plates of the liquid crystal display device of the present invention have a first polarizing plate and a second polarizing plate which are described below, the liquid crystal display device is preferably an IPS, OCB, or VA-mode liquid crystal display device in which at least one of the polarizing plates is the polarizing plate of the present invention.

The liquid crystal display device of the present invention preferably includes a liquid crystal cell and polarizing plates which are laminated on both sides of the liquid crystal cell and are equipped with an optical film on a surface on the opposite side to the liquid crystal. That is, the liquid crystal display device of the present invention preferably includes a first polarizing plate, a liquid crystal cell, and a second polarizing plate and is preferably equipped with the optical film of the present invention on a surface opposite to the surface of the polarizing plate sandwiched by the respective polarizing plates and the liquid crystal cell. The liquid crystal display having the above-described configuration is excellent in terms of the suppression of display unevenness and exhibits a high display performance.

In addition, the liquid crystal display device of the present invention preferably includes an optical film in which a polarizing plate disposed on the viewer side includes the hard coat layer on the surface of the optical film on the viewer side, particularly, the cellulose acylate film. The liquid crystal display having the above-described configuration exhibits excellent light durability in addition to a high display performance that is excellent in terms of the suppression of display unevenness.

Figure 2:
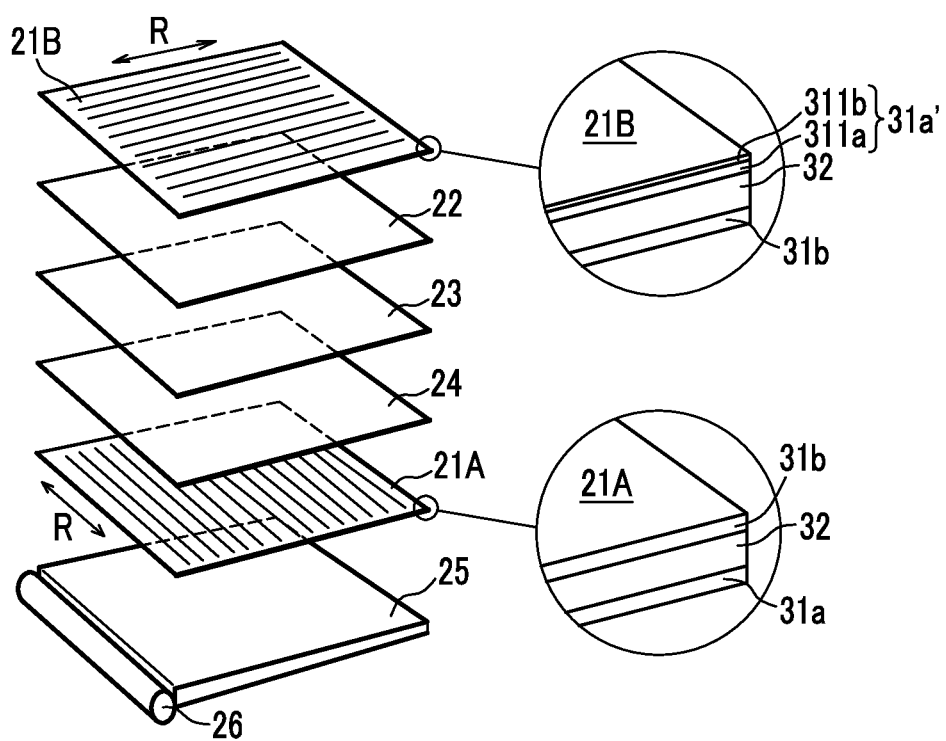
FIG. 2 is an exploded perspective view schematically illustrating the internal structure of another liquid crystal display device of the present invention.

As the liquid crystal display device of the present invention, the internal configuration of a typical liquid crystal display device is illustrated in FIGS. 1 and 2. FIG. 1 illustrates a liquid crystal display device including polarizing plates 21A and 21B in which the optical films 31a and 31b of the present invention made of the cellulose acylate film are disposed on both surfaces of a polarizer 32. In addition, FIG. 2 illustrates a liquid crystal display in which the polarizing plate 21B disposed on the viewer side is equipped with an optical film 31*a* including a hard coat layer 311*b* on the viewer-side surface of the polarizer 32 through a cellulose acylate film 311*a*.

Meanwhile, FIGS. 1 and 2 illustrate the configuration of an example of the liquid crystal display device of the present invention. There is no particular limitation regarding the specific configuration of the liquid crystal display device of the present invention and a well-known configuration can be employed. In addition, it is also possible to preferably employ the configuration illustrated in FIG. 2 of JP2008-262161A.

EXAMPLES

Hereinafter, the present invention will be more specifically described using examples but the present invention is not interpreted to be limited by these examples.

Synthesis Examples

Exemplary Compounds (1), (2), (9), (13), and (21) illustrated below were synthesized.

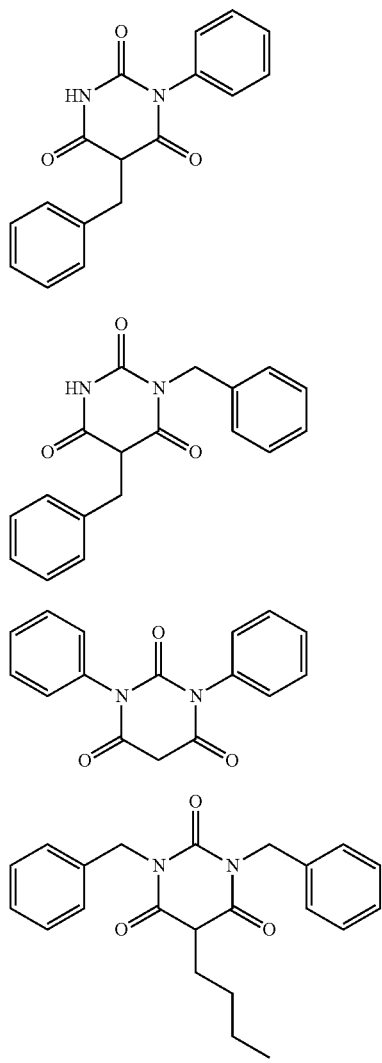

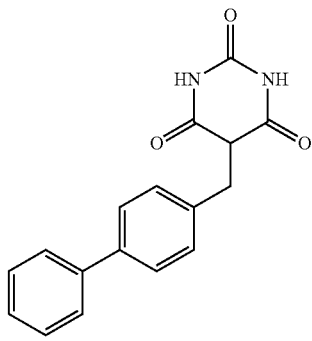

Synthesis Example 1

Synthesis of Exemplary Compound (1)

N-Phenyl urea (27.2 g (0.20 mol)), diethyl benzylmalonate (60.1 g (0.24 mol)), and a 20% sodium ethoxide/ethanol solution (102.1 g (0.30 mol)) were prepared in a 300 ml three-neck flask equipped with a thermometer, a reflux condenser, and a stirrer and were continuously stirred for four hours under heating and refluxing. After that, some of ethanol was distilled away, the solution was cooled to room temperature, and ethyl acetate (100 mL) was added thereto. The precipitated solid was filtered through suction filtration and was washed with ethyl acetate. This solid (sodium salt) was dissolved in water (100 mL) and hydrochloric acid was added dropwise so that the pH reached 1, thereby precipitating the solid. The precipitated solid was filtered through suction filtration and was washed with water. Furthermore, this crude product was washed under heating with an isopropyl alcohol, then, was cooled to room temperature and then filtered, and was dried at a reduced pressure, thereby obtaining Exemplary Compound (1) (43.1 g, yield ratio: 68%) as a white solid.

The data of the synthesized Exemplary Compound 1 will be described below.

$^1$H-NMR (300 MHz, DMSO-d6)δ: 3.34 (2H), 4.08 (m, 1H), 7.00-7.48 (m, 10H), 11.52 (br, 1H)

Melting point: 122° C.

ClogP value: 1.75

Exemplary Compounds (2), (9), (13), and (21) were respectively synthesized using a method that was similar to the method for Exemplary Compound (1) or the method described in the above-described document under conditions changed as described below.

The synthesis of Exemplary Compound (2): synthesized in the same manner as Exemplary Compound (1) except for the fact that N-benzyl urea was used instead of N-phenyl urea.

The synthesis of Exemplary Compound (9): synthesized in the same manner as Exemplary Compound (1) except for the fact that N,N'-diphenyl urea was used instead of N-phenyl urea and diethyl malonate was used instead of diethyl benzylmalonate.

The synthesis of Exemplary Compound (13): synthesized in the same manner as Exemplary Compound (1) except for the fact that N,N'-dibenzyl urea was used instead of N-phenyl urea and diethyl n-butyl malonate was used instead of diethyl benzylmalonate.

The synthesis of Exemplary Compound (21): synthesized in the same manner as Exemplary Compound (1) except for the fact that urea was used instead of N-phenyl urea and diethyl p-phenylbenzylmalonate was used instead of diethyl benzylmalonate.

In addition, furthermore, Exemplary Compounds (4), (5), (6), (7), (10), (14), (20), (22), and (27) were also, similarly, synthesized using a method that was similar to the method for Exemplary Compound (1) or the method described in the above-described document.

Hereinafter, the data of the synthesized typical compounds will be described.

Exemplary Compound (2)
$^1$H-NMR (300 MHz, DMSO-d6)δ: 3.32 (2H), 4.09 (s, 1H), 4.70-4.91 (m, 2H), 76.92-7.30 (m, 10H), 11.50 (br, 1H)
Melting point: 114° C.
ClogP value: 2.75

Exemplary Compound (4)
Melting point: 210° C.
ClogP value: 0.50

Exemplary Compound (6)
$^1$H-NMR (300 MHz, CDCl$_3$)δ: 3.13 (s, 3H), 3.50 (m, 3H), 3.75 (t, 1H), 7.10 (m, 2H), 7.26 (m, 3H)
ClogP value: 0.98

Exemplary Compound (7)
$^1$H-NMR (300 MHz, DMSO-d6)δ: 3.01 (s, 6H), 3.27 (d, 2H), 4.03 (t, 1H), 7.04 (m, 2H), 7.21 (m, 3H)
Melting point: 115° C.
ClogP value: 1.16

Exemplary Compound (9)
$^1$H-NMR (300 MHz, DMSO-d6)δ: 4.00 (s, 2H), 7.29 (m, 4H), 7.38-7.50 (m, 6H)
Melting point: 247° C.
ClogP value: 2.92

Exemplary Compound (10)
$^1$H-NMR (300 MHz, DMSO-d6)δ: 3.95 (s, 2H), 4.95 (s, 2H), 7.23-7.36 (m, 10H) ClogP value: 3.25

Exemplary Compound (20)
Melting point: 205° C.
ClogP value: 1.93

Example 1

(A) The Production and Evaluation of the Cellulose Acylate Film (the Optical Film)-1-

(Preparation of Cellulose Acetate)

Cellulose acetate having a total degree of acetyl substitution (B) of 2.87 was prepared. Acetylation reaction was carried out under 40° C. by adding sulfuric acid (7.8 parts by mass in relation to 100 parts by mass of cellulose) as a catalyst and acetic acid to the cellulose acetate. In addition, aging was carried out at 40° C. after the acetylation. Furthermore, a low-molecular-weight component of the cellulose acetate was washed with acetone so as to be removed.

(Optical Film: Production of Monolayer Cellulose Acylate Film)

The following composition was injected into a mixing tank and was stirred so as to dissolve individual components, thereby preparing a cellulose acetate solution.

| Composition of a cellulose acetate solution | |
|---|---|
| Cellulose acetate having a total degree of acetyl substitution (B) of 2.87 and degree of polymerization of 370 | 100.0 parts by mass |

| Composition of a cellulose acetate solution | |
|---|---|
| Compound represented by General Formula (I) described in Table 1 described below or derivatives thereof | 10.0 parts by mass |
| Methylene chloride (first solvent) | 402.0 parts by mass |
| Methanol (second solvent) | 60.0 parts by mass |

The cellulose acetate solution was cast using a band casting machine, and was dried at 100° C. until the content of the residual solvent reached 40%, and then, the film was peeled off. The peeled film was further dried at an atmospheric temperature of 140° C. for 20 minutes. The film thickness of the obtained optical film (cellulose acylate film) was 60 µm. Individual optical films described in Table 1 described below were produced as described above.

(Evaluation of Surface Hardness)

The surface hardness of each of the optical films 101 to 105 and c01 to c03 manufactured as described above was measured.

Using "a FISCHER SCOPE H100Vp-type hardness meter" manufactured by Fischer Instruments K.K. Japan, the surface of a sample fixed to a glass substrate was measured with a Knoop indenter having the orientation of the short axis of the indenter disposed in parallel to the transportation direction (longitudinal direction; the testing direction in a pencil hardness test) during the formation of the cellulose acylate film under conditions of a loading time of 10 seconds, a creep time of 5 seconds, an unloading time of 10 seconds, and a maximum load of 50 mN. The surface hardness was obtained by calculating the hardness at five points of the optical film from the relationship among the indentation depth, the contact area of the intender and the sample and the maximum load, and averaging the hardness.

In addition, using "a FISCHER SCOPE H100Vp-type hardness meter" manufactured by Fischer Instruments K.K. Japan, the surface of a sample fixed to a glass substrate was measured according to the method of JIS Z 2251 under conditions of a loading time of 10 seconds, a creep time of 5 seconds, an unloading time of 10 seconds, and an indentation load of 50 mN and the hardness was calculated from the relationship among the indentation depth, the contact area of the intender and the sample, and the maximum load. Meanwhile, JIS Z 2251 refers to the Japanese Industrial Standards produced on the basis of ISO4545.

Furthermore, the Knoop hardness was measured in all directions by equally rotating the Knoop indenter at the same indentation position every 10 degrees and measuring the hardness in a total of 18 directions and the minimum value was obtained. As a result, the minimum value was identical to the surface hardness measured by disposing the orientation of the short axis of the above-described Knoop indenter in parallel to the transportation direction (longitudinal direction; the testing direction in a pencil hardness test) during the formation of the cellulose acylate film. The unit was N/mm$^2$.

The obtained values were evaluated on the basis of the following standards and the results are described in Table 1 described below.

Meanwhile, when the evaluation was "C" or higher, the cellulose acylate film had high hardness and was sufficiently practical from the viewpoint of workability.

The evaluation standards of the surface hardness
A: The Knoop hardness was 225 N/mm$^2$ or higher.
B: The Knoop hardness was in a range of 210 N/mm$^2$ to less than 225 N/mm$^2$.

C: The Knoop hardness was in a range of 190 N/mm² to less than 210 N/mm².
D: The Knoop hardness was in a range of 180 N/mm² to less than 190 N/mm².
E: The Knoop hardness was lower than 180 N/mm².

(Measurement of Modulus of Tensile Elasticity)

A sample (150 mm×10 mm) was cut out from each of the optical films produced above, the stresses at a 0.1% stretching and a 0.5% stretching were measured using an universal tensile tester "STM T50BP" manufactured by Toyo Baldwin Co., Ltd. at a tensile speed of 10%/minute in an atmosphere of 25° C. and 60 RH %, and the moduli of elasticity were obtained from the slope. Meanwhile, the moduli of elasticity were measured in two arbitrary directions that were orthogonal to each other, the geometric means thereof was obtained, and the obtained value was used as the modulus of tensile elasticity (unit: GPa).

(Production of Hard Coat Layer-Attached Optical Film)

A hard coat layer solution of the following curable composition was applied onto the surface of a monolayer optical film made of each cellulose acylate produced above and was cured by radiating an ultraviolet ray, to produce a hard coat layer having a film thickness of 6 μm-attached optical film.

In Table 1 described below, common film Nos. are assigned to both the monolayer optical film Nos. and the hard coat layer-attached optical film Nos. corresponding thereto. Meanwhile, in the following examples as well, monolayer optical films and hard coat layer-attached optical films corresponding thereto were produced and the same numbers were assigned.

| Curable composition of a hard coat layer solution | |
|---|---|
| Monomer pentaerythritol triacrylate/pentaerythritol tetraacrylate (mixing mass ratio: 3/2) | 53.5 parts by mass |
| UV Polymerization initiator Irgacure ™ 907 (manufactured by Ciba Specialty Chemicals Inc.) | 1.5 parts by mass |
| Ethyl acetate | 45 parts by mass |

(Method for Evaluating Adhesiveness)

The cross-cut test based on JIS K 5600 was carried out on each of the hard coat layer-attached optical films 101 to 105 and c01 to c03 produced above. Specifically, the fully-cured hard coat layer-attached optical film was irradiated with Xe for 48 hours. 11 horizontal lines and 11 vertical lines were notched on the hard coat layer irradiated with Xe at intervals of 1 mm so as to produce 100 (1 mm×1 mm) grids. Cellophane tape and mylar tape were attached thereon, and were rapidly peeled off, and peeled positions were visually observed, thereby evaluating adhesiveness. Meanwhile, for the radiation of Xe, a super xenon weather meter SX75 manufactured by Suga Test Instruments Co., Ltd. was used.

The adhesiveness was evaluated using the following standards and the results are described in Table 1 described below. When the evaluation was "B" or higher, the adhesiveness between the cellulose acylate film and the hard coat layer was high and excellent light durability was exhibited.

The evaluation standards of the adhesiveness
A: The number of peeled positions was in a range of 0 to 30.
B: The number of peeled positions was in a range of 31 to 50.
C: The number of peeled positions was in a range of 51 to 65.
D: The number of peeled positions was in a range of 66 to 80.
E: The number of peeled positions was 81 or more.

These results are summarized in Table 1 described below.

TABLE 1

| Film No. | Compound No. | Amount added (parts by mass[Note 1]) | Modulus of tensile elasticity (GPa) | Knoop hardness Measured value (N/mm²) | Evaluation | Adhesiveness | Remark |
|---|---|---|---|---|---|---|---|
| 101 | (1) | 10 | 4.51 | 230 | A | A | The Present Invention |
| 102 | (2) | 10 | 4.25 | 212 | B | A | |
| 103 | (9) | 10 | 4.34 | 218 | B | B | |
| 104 | (13) | 10 | 3.72 | 190 | C | A | |
| 105 | (21) | 10 | 4.30 | 215 | B | B | |
| c01 | Comparative Compound 1 | 10 | 4.54 | 231 | A | C | Comparative Examples |
| c02 | Comparative Compound 2 | 10 | 3.6 | 181 | D | B | |
| c03 | None | 10 | 3.59 | 178 | E | A | |

[Note 1]Parts by mass in relation to 100 parts by mass of cellulose acylate

Here, Comparative Compound 1 refers to the organic acid A described in JP2011-118135A and Comparative Compound 2 refers to the oil gelation agent (33) described in JP2002-322294A.

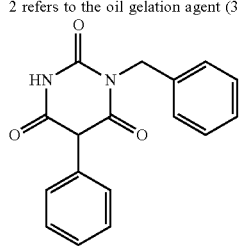

Comparative compound 1

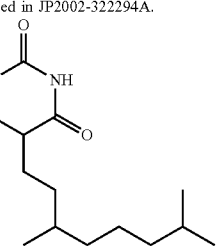

Comparative compound 2

As is clear from Table 1, it was found that the hard coat layer-attached optical films 101 to 105 of the present invention were all excellent in terms of modulus of tensile elasticity, hardness, and adhesiveness compared with the hard coat layer-attached optical films for which the comparative compounds were used and the compound represented by General Formula (I) of the present invention contributed to the improvement of the modulus of tensile elasticity, hardness, and adhesiveness of the hard coat layer-attached optical film.

It is considered that the compound represented by General Formula (I) easily enters voids among the polymer chains of cellulose acetate and effectively forms a hydrogen bond with an ester bond of the cellulose acetate and thus the hardness was improved.

When compared with Comparative Compound 2 in the optical film c02, the optical films 101 to 105 of the present invention all exhibit high hardness. This is considered that the compound represented by General Formula (I) has a ring structure and thus has excellent compatibility with cellulose acetate and, furthermore, the interaction with a hydrogen bond becomes stronger.

In addition, when compared with Comparative Compound 1 in the optical film c01, the optical films 101 to 105 of the present invention all exhibit high adhesiveness with the hard coat layer. This is considered that the compound represented by General Formula (I) has an alkyl group or a hydrogen atom at the fifth position of the skeleton thereof and thus the absorption wavelength in the film becomes short and the deterioration of cellulose acetate due to the radiation of light is suppressed.

Example 2

(B) the Production and Evaluation of the Cellulose Acylate Film (the Optical Film)-2-

Optical films 121 to 129 of the present invention were produced in the same manner as in Example 1 except for the fact that the kinds of the compound represented by General Formula (I) were changed as described in Table 2 described below. The respective characteristics were evaluated in the same manner as in Example 1.

TABLE 2

| Film No. | Compound represented by General Formula (I) | | Film performances | | Remark |
|---|---|---|---|---|---|
| | Compound No. | Amount added (parts by mass[Note 1]) | Knoop hardness | Adhesiveness | |
| 121 | (4) | 10 | B | A | The Present Invention |
| 122 | (5) | 10 | A | A | |
| 123 | (6) | 10 | B | A | |
| 124 | (7) | 10 | C | A | |
| 125 | (10) | 10 | A | A | |
| 126 | (14) | 10 | A | A | |
| 127 | (20) | 10 | B | A | |
| 128 | (22) | 10 | A | B | |
| 129 | (27) | 10 | A | A | |

[Note 1] Parts by mass in relation to 100 parts by mass of cellulose acylate

Example 3

In the same manner as in Example 1, optical films 131 to 136 of the present invention were produced in the same manner as in Example 1 except for the fact that the degree of substitution of cellulose acylate and the kinds of the respective additives (the compound represented by General Formula (I)) were changed as described in Table 3 described below.

The respective characteristics were evaluated in the same manner as in Example 1.

The respective values of the Knoop hardness were evaluated according to the following standards by comparing them with the value of the Knoop hardness of the films produced without adding the additives and the results are described in Table 3 described below.

A: 1.15 or more times the value of the Knoop hardness of a case in which the additives were not added B: 1.05 to less than 1.15 times the value of the Knoop hardness of a case in which the additives were not added C: 1.00 to less than 1.05 times the value of the Knoop hardness of a case in which the additives were not added D: Less than 1.00 times the value of the Knoop hardness of a case in which the additives were not added

TABLE 3

| Film No. | Cellulose acylate Degree of acetyl substitution | Compound represented by General Formula (I) | | Film thickness (μm) | Film performances | | Remark |
|---|---|---|---|---|---|---|---|
| | | Compound No. | Amount added (parts by mass[Note 1]) | | Knoop hardness | Adhesiveness | |
| 131 | 2.42 | (1) | 10 | 54 | A | B | The Present Invention |
| 132 | 2.42 | (2) | 10 | 61 | B | B | The Present Invention |
| 133 | 2.77 | (5) | 10 | 62 | B | B | The Present Invention |
| 134 | 2.93 | (1) | 10 | 57 | A | B | The Present Invention |

TABLE 3-continued

| Film No. | Cellulose acylate Degree of acetyl substitution | Compound represented by General Formula (I) Compound No. | Amount added (parts by mass^Note 1)) | Film thickness (μm) | Film performances Knoop hardness | Adhesiveness | Remark |
|---|---|---|---|---|---|---|---|
| 135 | 2.93 | (5) | 10 | 59 | A | A | The Present Invention |
| 136 | 2.93 | (9) | 10 | 60 | A | A | The Present Invention |

Note 1) Parts by mass in relation to 100 parts by mass of cellulose acylate

As is clear from Table 3, it was found that the optical films 131 to 136 of the present invention including the compound represented by General Formula (I) had an excellent hardness and adhesiveness and the compound represented by General Formula (I) was effective for the improvement of hardness and adhesiveness in association with, particularly, cellulose acetate having a high total degree of acetyl substitution (B).

Example 4

Optical films 141 to 144 and c41 to c43 were produced in the same manner as in Example 1 except for the fact that the kind of the cellulose acylate, the kinds of the respective additives (the compound represented by General Formula (I)), and the film thicknesses of the cellulose acylate films were changed as described in Table 4 described below.

The respective characteristics were evaluated in the same manner as in Example 1. However, in the evaluation of the surface hardness, the indentation load was changed depending on the film thickness as described below.

<Evaluation of Surface Hardness>

The surface hardness of the optical film obtained above was measured in the same manner as in the method described in Example 1 except for the fact that the indentation load was set to 20 mN. The unit was N/mm².

The respective values of the Knoop hardness of the films were evaluated according to the following standards by comparing them with the value of the Knoop hardness of the films produced without adding the additives.

A: 1.15 or more times the value of the Knoop hardness of a case in which the additives were not added B: 1.05 to less than 1.15 times the value of the Knoop hardness of a case in which the additives were not added C: 1.00 to less than 1.05 times the value of the Knoop hardness of a case in which the additives were not added D: Less than 1.00 times the value of the Knoop hardness of a case in which the additives were not added

TABLE 4

| Film No. | Cellulose acylate Degree of acetyl substitution | Compound represented by General Formula (I) Compound No. | Amount added (parts by mass^Note 1)) | Film thickness (μm) | Film performances Knoop hardness | Adhesiveness | Remark |
|---|---|---|---|---|---|---|---|
| 141 | 2.86 | (1) | 12 | 31 | A | A | The Present Invention |
| 142 | 2.86 | (2) | 12 | 26 | B | A | The Present Invention |
| 143 | 2.86 | (5) | 12 | 23 | A | A | The Present Invention |
| 144 | 2.86 | (9) | 12 | 42 | A | B | The Present Invention |
| c41 | 2.86 | Comparative Compound 1 | 12 | 25 | A | C | Comparative Example |
| c42 | 2.86 | Comparative Compound 2 | 12 | 27 | D | B | Comparative Example |
| c43 | 2.86 | None | 0 | 26 | — | A | Comparative Example |

Note 1) Parts by mass in relation to 100 parts by mass of cellulose acylate

As is clear from Table 4, it was found that the film including the compound of the present invention was capable of exhibiting preferred surface hardness and adhesiveness even when the thickness thereof was reduced.

Example 5

Evaluation of Pencil Hardness

After the humidity of each of the hard coat layer-attached optical films was adjusted for two hours under conditions of 25° C. and a relative humidity of 60%, the surface of the hard coat layer was repeatedly scratched five times using 500 g weights and testing pencils with different hardness values, which were regulated by JIS-S6006, until a single flaw was generated, according to the evaluation method for pencil hardness regulated by JIS-K5400, to measure the hardness thereof. Meanwhile, while examples of the flaw defined by JIS-K5400 include the breakage of a coated film and the scratch of a coated film, but do not include a dent in a coated film, in the present evaluation, a dent in a coated film was also determined as the flaw. Practically, the hardness is preferably 3H or higher and a higher value is preferred since the higher value indicates higher hardness. As a result, it was found that the optical films 101 to 105 produced using the compound represented by General Formula (I) of the present invention all exhibited favorable values of 3H.

Example 6

(C) the Production and Evaluation of the Polarizing Plate Protective Film (the Optical Film) and the Polarizing Plate (C-1) the Production of the Polarizing Plate Protective Film (the Optical Film)
(Preparation of Cellulose Acetate)
As cellulose acetate, the cellulose acetate prepared in Example 1 was used.
(Preparation of Dope for Surface Layer)
Preparation of a Cellulose Acetate Solution
The following composition was injected into a mixing tank and was stirred so as to dissolve individual components, thereby preparing a cellulose acetate solution.

| Composition of a cellulose acetate solution | |
|---|---|
| Cellulose acetate having a total degree of acetyl substitution (B) of 2.87 and a degree of polymerization of 370 | 100.0 parts by mass |
| MONOPET (registered trademark) SB (plasticizer) manufactured by DKS Co., Ltd. | 9.0 parts by mass |
| SAIB-100 (plasticizer) manufactured by Eastman Chemical Company | 3.0 parts by mass |
| Methylene chloride (first solvent) | 353.9 parts by mass |
| Methanol (second solvent) | 89.6 parts by mass |
| n-Buthanol (third solvent) | 4.5 parts by mass |

Meanwhile, MONOPET (registered trademark) SB (plasticizer) manufactured by DKS Co., Ltd. is a benzoic acid ester of sucrose and SAIB-100 (plasticizer) manufactured by Eastman Chemical Company is a mixed ester of acetic acid and isobutyric acid of sucrose.
Preparation of Matting Agent Solution
The following composition was injected into a disperser and was stirred so as to dissolve individual components, thereby preparing a matting agent solution.

| Composition of a matting agent solution | |
|---|---|
| Silica particles having an average particle size of 20 nm (AEROSIL R972, manufactured by Nippon Aerosil Co., Ltd.) | 2.0 parts by mass |
| Methylene chloride (first solvent) | 69.3 parts by mass |
| Methanol (second solvent) | 17.5 parts by mass |
| n-Buthanol (third solvent) | 0.9 parts by mass |
| The above-described cellulose acylate solution prepared | 0.9 parts by mass |

Preparation of Ultraviolet Absorber Solution
The following composition was injected into a mixing tank and was stirred under heating so as to dissolve individual components, thereby preparing an ultraviolet absorber.

| Composition of an ultraviolet absorber solution | |
|---|---|
| Ultraviolet absorber (UV-1) described below | 20.0 parts by mass |
| Methylene chloride (first solvent) | 61.0 parts by mass |
| Methanol (second solvent) | 15.4 parts by mass |
| n-Buthanol (third solvent) | 0.8 parts by mass |
| The above-described cellulose acylate solution prepared | 12.8 parts by mass |

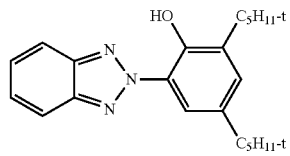

(UV-1)

The matting agent solution (1.3 parts by mass) and the ultraviolet absorber solution (3.4 parts by mass) were respectively filtered, then, were mixed together using an inline mixer, furthermore, the cellulose acetate solution (95.3 parts by mass) was added thereto, and the components were mixed together using the inline mixer, thereby preparing a dope for a skin layer (surface layer).
(Preparation of Dope for Base Layer)
Preparation of Cellulose Acetate Solution
The following composition was injected into a mixing tank and was stirred under heating so as to dissolve individual components, thereby preparing a dope for the base layer.

| Composition of a cellulose acetate solution | |
|---|---|
| Cellulose acetate having a total degree of acetyl substitution (B) of 2.87 and a degree of polymerization of 370 | 100.0 parts by mass |
| MONOPET (registered trademark) SB (plasticizer) manufactured by DKS Co., Ltd. | 9.0 parts by mass |
| SAIB-100 (plasticizer) manufactured by Eastman Chemical Company | 3.0 parts by mass |
| Exemplary Compound (1) | 4.0 parts by mass |
| The above-described ultraviolet absorber (VU-1) | 2.0 parts by mass |
| Methylene chloride (first solvent) | 297.7 parts by mass |
| Methanol (second solvent) | 75.4 parts by mass |
| n-Buthanol (third solvent) | 3.8 parts by mass |

(Casting)
Using a drum casting apparatus, the dope for the base layer prepared as described above and a pair of the dopes for the skin layer (surface layer) disposed on both sides of the dope for the base layer were uniformly cast at the same time from the casting opening on a stainless steel casting support (with a support temperature of −9° C.). The layers were peeled off in a state in which the amounts of the residual solvent in the dopes for the respective layers were approximately 70% by mass, both edges of the film in the width direction were fixed using pin tenters, and the film was stretched 1.28 times in the transverse direction and was dried in a state in which the amounts of the residual solvent were in a range of 3% by mass to 5% by mass. After that, the film was further dried by transporting the film between the rolls of a heat treatment apparatus and a cellulose acetate film 201 was obtained as the optical film of the present invention. The obtained cellulose acetate film 201 had a thickness of 60 μm and a width of 1480 mm.

A cellulose acetate film C01 was produced in the same manner except for the fact that Exemplary Compound (1) was not added in the production of the cellulose acetate film 201.

In addition, in the production of the cellulose acetate film 201, the film was cast and dried so that the obtained cellulose acetate film had a film thickness of 40 μm and a width of 1480 mm, thereby producing a cellulose acetate film 211 as the optical film of the present invention.

A cellulose acetate film C11 was produced in the same manner except for the fact that Exemplary Compound (1) was not added in the production of the cellulose acetate film 211.

Similarly, in the production of the cellulose acetate film 201, the film was cast and dried so that the obtained cellulose acetate film had a film thickness of 25 μm and a width of 1480 mm, thereby producing a cellulose acetate film 221 as the optical film of the present invention.

A comparative cellulose acetate film C21 was produced in the same manner except for the fact that Exemplary Compound (1) was not added in the production of the cellulose acetate film 221.

Furthermore, a cellulose acetate film 231 as the optical film of the present invention was produced in the same manner as the cellulose acetate film 201 except for the fact that, in the production of the cellulose acetate film 201, 12 parts by mass of a polycondensed polymer (A) described below, which was a polycondensed ester-based plasticizer, was added instead of MONOPET (registered trademark) SB and SAIB-100.

A cellulose acetate film C31 was produced in the same manner except for the fact that Exemplary Compound (1) was not added in the production of the cellulose acetate film 231.

Polycondensed polymer (A): A polyester made up of adipic acid and ethanediol (having a hydroxyl group at the terminal) (number-average molecular weight=1000)

For each of the produced cellulose acetate films, the surface hardness and the adhesiveness to the hard coat layer were evaluated. The above-described characteristics were evaluated in the same manner as in Example 1. Meanwhile, the adhesiveness to the hard coat layer was evaluated by applying and curing a hard coat layer solution having the above-described composition on the surface of each of the cellulose acetate films and forming a 6 μm-thick hard coat layer in the same manner as in Example 1. Furthermore, in the present example, the pencil hardness was also evaluated using the following method as the hardness of the hard coat layer-attached optical film.

The obtained results are summarized in Table 5 described below.

Hereinafter, the produced cellulose acetate films will also be referred to as polarizing plate protective films.

Meanwhile, the surface hardness was measured in the same manner as in Example 1; however, for the films 221 and C21, the surface hardness was measured with the indentation load set to 20 mN in accordance with the film thickness of the films. The evaluation standards were evaluated in the following steps.

The evaluation standards of the surface hardness of the polarizing plate protective films The surface hardness was compared with the value of the surface hardness of the optical film produced without adding the compound represented by General Formula (1).

A: 1.15 or more times the value of the Knoop hardness of a case in which the additives were not added B: 1.05 to less than 1.15 times the value of the Knoop hardness of a case in which the additives were not added C: 1.00 to less than 1.05 times the value of the Knoop hardness of a case in which the additives were not added D: Less than 1.00 times the value of the Knoop hardness of a case in which the additives were not added (Evaluation of Pencil Hardness)

After the humidity of each of the hard coat layer-attached cellulose acylate films was adjusted for two hours under conditions of 25° C. and a relative humidity of 60%, the surface of the hard coat layer was repeatedly scratched five times using 500 g weights and testing pencils with different hardness values, which were regulated by JIS-S6006, until a single flaw was generated, according to the evaluation method for pencil hardness regulated by JIS-K5400, to measure the hardness thereof. Meanwhile, while examples of the flaw defined by JIS-K5400 include the breakage of a coated film and the scratch of a coated film, but do not include a dent in a coated film, in the present evaluation, a dent in a coated film was also determined as the flaw. Practically, the hardness is preferably 3H or higher and a higher value is preferred since the higher value indicates higher hardness. As a result, it was found that the optical films produced using the compound represented by General Formula (I) of the present invention all exhibited favorable values of 3H.

(C-2) the Production of the Polarizing Plate (The Saponification Treatment of the Polarizing Plate Protective Film)

The polarizing plate protective film 201 made of the cellulose acetate film produced in (C-1) was immersed in an aqueous solution of sodium hydroxide (2.3 mol/L) at 55° C. for three minutes. The film was washed in a water-washing tank at room temperature and was neutralized at 30° C. using sulfuric acid (0.05 mol/L). Again, the film was washed in the water-washing tank at room temperature and, furthermore, was dried with hot air (100° C.). A saponification treatment was carried out on the surface of the polarizing plate protective film 201. Meanwhile, as the polarizer, an ordinarily-used polarizer as described in the above-described "polarizer" section was used.

(Production of Polarizing Plate)

Iodine was adsorbed to a stretched polyvinyl alcohol film, thereby producing a polarizer.

The polarizing plate protective film 201 that was produced in (C-1) and was subjected to the saponification treatment was attached to a single side of a polarizer using a polyvinyl alcohol-based adhesive. The same saponification treatment was also carried out on a commercially available cellulose triacetate film (FUJITAC TD80UF, manufactured by Fujifilm Corporation) and the saponification-treated commercially available cellulose triacetate film was attached to the surface of the polarizer that was on the opposite side to the surface to which the saponification-treated polarizing plate protective film 201 was attached using a polyvinyl alcohol-based adhesive.

At this time, the transmission axis of the polarizer was disposed so as to be in parallel with the slow axis of the saponification-treated polarizing plate protective film 301 produced in (C-1). In addition, the transmission axis of the polarizer was disposed so as to be orthogonal to the slow axis of the saponification-treated commercially available cellulose triacetate film.

A polarizing plate 201 of the present invention was produced as described above.

For the polarizing plate protective films 211 to 231 of the present invention and the comparative polarizing plate protective films CO 1 to C31 as well, the saponification treatments and the production of the polarizing plates were respectively carried out in the same manner as described above and polarizing plates 211 to 231 of the present invention and comparative polarizing plates C01 to C31 were respectively produced.

(Evaluation of the Durability of the Polarizing Plate)

The test of the durability of the polarizing plate was carried out as described below in a state in which the polarizing plate was attached to glass through an adhesive.

In the present invention, the single plate orthogonal transmission ratio CT of the polarizing plate was measured through the following method in a range of 380 nm to 780 nm using an automatic polarization film measurement instrument VAP-7070 manufactured by JASCO Corporation and the measurement value at a wavelength of 410 nm was employed.

Two samples (5 cm×5 cm) were produced by attaching the polarizing plate of the present invention onto glass through an adhesive. At this time, the polarizing plate protective film of the present invention was attached so as to be on the opposite side (air interface) to the glass. The orthogonal transmission ratio was measured with the glass side of the sample set to face a light source. The two samples were respectively measured and the average value thereof was used as the orthogonal transmission ratio CT.

After that, the respective polarizing plates were stored for a certain period of time under conditions in accordance with the film thicknesses of the films and then the orthogonal transmission rates CT were measured using the same method. The change in the orthogonal transmission ratio CT before and after the storage was obtained and was evaluated as the durability of the polarizing plates using the following standards.

The orthogonal transmission ratios before the storage were all 0.10% or less. When the following evaluation was "B" or higher, the durability of the polarizing plate was excellent.

Meanwhile, the relative humidity under an environment in which the humidity was not adjusted was in a range of 0% RH to 20% RH.

The obtained results were described in Table 5.

—Storage Conditions—

Polarizing plates 201, 231, C01, C31: 168 hours and 336 hours in an environment of 80° C. and a relative humidity of 90% RH Polarizing plates 211, C11: 120 hours and 240 hours in an environment of 80° C. and a relative humidity of 90% RH Polarizing plates 221, C21: 500 hours and 1000 hours in an environment of 60° C. and a relative humidity of 95% RH The evaluation standards of the durability of the polarizing plate A: The change in the orthogonal transmission rate before and after storage was less than 0.6%.

B: The change in the orthogonal transmission rate before and after storage was in a range of 0.6% to less than 0.75%.

C: The change in the orthogonal transmission rate before and after storage was in a range of 0.75% to less than 1.0%.

D: The change in the orthogonal transmission rate before and after storage was 1.0% or more.

TABLE 5

| Film No. | Compound represented by General Formula (I) Compound No. | Amount added (parts by mass[Note 1]) | Polycondensed ester-based plasticizer Kinds | Amount added (parts by mass[Note 1]) | Film thickness (μm) | Knoop hardness | Adhesiveness | Durability of polarizing plate | Remark |
|---|---|---|---|---|---|---|---|---|---|
| 201 | (1) | 4 | None | — | 60 | B | A | A | The Present Invention |
| 211 | (1) | 4 | None | — | 40 | A | A | A | |
| 221 | (1) | 4 | None | — | 25 | A | A | A | |
| 231 | (1) | 4 | Polymer (A)[Note 2] | 12 | 60 | B | A | A | |
| C01 | None | — | None | — | 60 | — | A | D | Comparative Example |
| C11 | None | — | None | — | 40 | — | A | D | |
| C21 | None | — | None | — | 25 | — | A | D | |
| C31 | None | — | Polymer (A)[Note 2] | 12 | 60 | — | A | D | |

Note 1) Parts by mass in relation to 100 parts by mass of cellulose acylate
Note 2) Polymer (A) = polycondensed polymer (A), a polyester made up of adipic acid and ethanediol (having a hydroxyl group at the terminal) (number-average molecular weight = 1000)

In Table 5, the amount of the compound represented by General Formula (I) added was expressed using parts by mass in relation to 100 parts by mass of the cellulose acetate in the base layer.

From the results of Table 5, the polarizing plate protective films 201 to 231, which were the optical films of the present invention including the compound represented by General Formula (I) of the present invention, all effectively suppressed the deterioration of the polarizer during the storage.

In contrast, the polarizing plate protection film C01, C11, C21, and C31, which were the comparative optical films not including the compound represented by General Formula (I) of the present invention, had poor durability of the polarizing plates compared with the polarizing plate protective film of the present invention.

(C-4) the Production and Evaluation of the Polarizing Plate-2-

The polarizing plate of the present invention was manufactured in the same manner as in Example 2 except for the fact that Exemplary Compounds (4), (7), and (13) were used instead of Exemplary Compound (1). For these polarizing plates, durability was evaluated in the same manner as in Example 2. As a result, the polarizing plate protective films of the present invention were all capable of suppressing the deterioration of the polarizers during storage.

As a result, when the polarizer of the present invention is used, it is possible to produce a liquid crystal display device having excellent performances described above.

The present invention has been described together with the embodiments thereof. However, the present inventors do not intend to limit the present invention in any detailed part of the description unless particularly otherwise specified and consider that the present invention is supposed to be widely interpreted within the concept and range of the invention described in the accompanying claims.

Explanation of References 21A, 21B: polarizing plate
22: color filter substrate
23: liquid crystal layer
24: array substrate
25: light guide plate
26: light source
31a, 31a, 31b: optical film (protective film for polarizing plate)
331a: cellulose acylate film
331b: hard coat layer
32: polarizer
R: polarizing direction

What is claimed is:

1. An optical film comprising:
   cellulose acylate,
   wherein an acyl group in the cellulose acylate is an acetyl group and a total degree of acetyl substitution B of the cellulose acylate satisfies a formula described below, $2.0 \leq B \leq 3.0$; and
   at least one kind of compound represented by General Formula (I) described below,

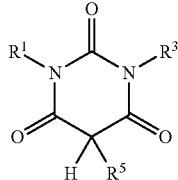

General Formula (I)

wherein in General Formula (I), each of $R^1$ and $R^3$ independently represents a hydrogen atom, an alkyl group having 1 to 20 carbon atoms, a cycloalkyl group having 3 to 20 carbon atoms, an alkenyl group having 2 to 20 carbon atoms, or an aromatic group having 6 to 20 carbon atoms, $R^5$ represents an aralkyl group represented by Formula (1) described below, and, with the proviso that the total of ring structures present in $R^1$, $R^3$, and $R^5$ is one or two,

*-L$^5$-Ar$^5$  Formula (1):

wherein in Formula (1), $L^5$ represents an alkylene group having 1 to 20 carbon atoms, which is substituted or unsubstituted, $Ar^5$ represents an aromatic group having 6 to 20 carbon atoms, and * is a position at which the aralkyl group is linked to the ring structure in General Formula (I).

2. The optical film according to claim 1, wherein $L^5$ in Formula (1) is a substituted or unsubstituted alkylene group represented by Formula (1-2) described below, -[C($R^{51}$)($R^{52}$)]n-  Formula (1-2):

wherein in Formula (1-2), each of $R^{51}$ and $R^{52}$ independently represents a hydrogen atom, an alkyl group having 1 to 19 carbon atoms, a cycloalkyl group having 3 to 19 carbon atoms, an alkenyl group having 2 to 19 carbon atoms, or an aromatic group having 6 to 19 carbon atoms, and n represents an integer from 1 to 20.

3. The optical film according to claim 1, wherein $L^5$ in Formula (1) is a substituted or unsubstituted methylene group or a substituted or unsubstituted ethylene group.

4. The optical film according to claim 1,
   wherein $Ar^5$ in Formula (1) is an unsubstituted aromatic group having 6 to 20 carbon atoms or an aromatic group having 6 to 20 carbon atoms substituted with a substituent having a negative Hammett substituent constant σp.

5. The optical film according to claim 1,
   wherein one of $R^1$ and $R^3$ in General Formula (I) has one aromatic ring structure.

6. The optical film according to claim 1,
   wherein the Hammett substituent constants σp and σm of $R^5$ in General Formula (I) are both negative.

7. The optical film according to claim 1,
   wherein the optical film is made up of at least two layers which is a hard coat layer and a layer including the cellulose acylate and at least one kind of compound represented by General Formula (I).

8. A polarizing plate comprising:
   a polarizer; and
   the optical film according to claim 1 on at least one surface of the polarizer.

9. A liquid crystal display device comprising at least:
   the polarizing plate according to claim 8; and
   a liquid crystal cell.

10. The liquid crystal display device according to claim 9, further comprising:
    a hard coat layer on a viewer-side surface of the polarizing plate disposed on a viewer-side.

11. A liquid crystal display device,
    wherein polarizing plates are provided on both sides of a liquid crystal cell, and
    at least one of the polarizing plates is the polarizing plate according to claim 8.

* * * * *